United States Patent
Fujimura et al.

(10) Patent No.: US 6,792,406 B1
(45) Date of Patent: Sep. 14, 2004

(54) INFORMATION PROCESSING APPARATUS, PORTABLE DEVICE, ELECTRONIC PET APPARATUS RECORDING MEDIUM STORING INFORMATION PROCESSING PROCEDURES AND INFORMATION PROCESSING METHOD

(75) Inventors: Satoshi Fujimura, Kanagawa (JP); Naohiro Yokoo, Kanagawa (JP); Yasuhiko Kato, Tokyo (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/622,772

(22) PCT Filed: Dec. 24, 1999

(86) PCT No.: PCT/JP99/07271

§ 371 (c)(1),
(2), (4) Date: Dec. 7, 2000

(87) PCT Pub. No.: WO00/38808

PCT Pub. Date: Jul. 6, 2000

(30) Foreign Application Priority Data

Dec. 24, 1998 (JP) .......................................... 10-365944

(51) Int. Cl.⁷ .............................................. G10L 15/00
(52) U.S. Cl. ...................................... 704/257; 704/260
(58) Field of Search .......................... 345/473; 704/257, 704/246, 260, 270, 272

(56) References Cited

U.S. PATENT DOCUMENTS

| | | | | |
|---|---|---|---|---|
| 5,367,454 A | * | 11/1994 | Kawamoto et al. | ......... 345/706 |
| 5,577,165 A | * | 11/1996 | Takebayashi et al. | ....... 704/275 |
| 5,953,700 A | * | 9/1999 | Kanevsky et al. | ........ 704/270.1 |
| 5,983,190 A | * | 11/1999 | Trower et al. | .............. 704/276 |
| 6,212,502 B1 | * | 4/2001 | Ball et al. | ..................... 704/207 |
| 6,388,665 B1 | * | 5/2002 | Linnett et al. | .............. 345/473 |
| 6,636,219 B2 | * | 10/2003 | Merrick et al. | ............. 345/473 |

FOREIGN PATENT DOCUMENTS

| | | |
|---|---|---|
| JP | 09-305787 | 11/1997 |
| JP | 10-206976 | 9/1998 |
| JP | 10-276462 | 10/1998 |
| JP | 10-313357 | 11/1998 |

OTHER PUBLICATIONS

International Search Report.

* cited by examiner

*Primary Examiner*—Daniel Abebe
(74) *Attorney, Agent, or Firm*—Rader, Fishman & Grauer PLLC; Ronald P. Kananen

(57) ABSTRACT

In an information processing apparatus, a portable device, an electronic pet apparatus, recording medium storing information processing procedures and an information processing method, various kinds of data is transmitted via a network, and in addition, words can be catalogued via voice. Further, various responses are made in accordance with user authentication, voice inputs and responses are classified into categories which are used as a basis for generating a response. Furthermore, the emotion of the electronic pet can be changed on the basis of a past history.

23 Claims, 22 Drawing Sheets

1: ELECTRONIC PET APPARATUS

| VARIABLE NAME | VALUE |
|---|---|
| FATIGUE | 22 |
| HUNGER | 10 |
| THIRSTINESS | 5 |
| SICKNESS | 1 |
| SLEEPINESS | 3 |

| VARIABLE NAME | VALUE |
|---|---|
| ANGER | 25 |
| SADNESS | 10 |
| JOY | 30 |
| FEAR | 8 |
| SURPRISE | 8 |
| HATRED | 3 |

|  | KEYWORD | | | |
|---|---|---|---|---|
|  | GOOD | BAD | HEY | DIRTY |
| VARIATIONS IN VARIABLE VALUE — ANGER | −1 | +10 | +5 | +5 |
| SADNESS | +2 | +10 | +5 | +5 |
| JOY | +20 | −10 | −10 | −15 |
| FEAR | −5 | +5 | +10 | −5 |
| SURPRISE | +5 | −1 | +10 | +5 |
| HATRED | −1 | +5 | +2 | +20 |

| VARIABLE NAME | VALUE |
|---|---|
| ANGER | 24 |
| SADNESS | 12 |
| JOY | 50 |
| FEAR | 3 |
| SURPRISE | 13 |
| HATRED | 2 |

| RESPONSE SENTENCE | VOICE-FILE NAME |
|---|---|
| I LOVE YOU, TOO | voice0001.wav |
| WOW, I AM A MALE THOUGH | voice0002.wav |
| SHUT UP | voice0003.wav |
| WHAT? | voice0004.wav |
| HOWDY | voice0005.wav |
| I AM SURPRISE | voice0006.wav |
| HI | voice0007.wav |
| DID YOU CALL ME? | voice0008.wav |

| RESPONSE SENTENCE | PICTURE-FILE NAME |
|---|---|
| I LOVE YOU, TOO | fig0001.bmp |
| WOW, I AM A MALE THOUGH | fig0002.bmp |
| SHUT UP | fig0003.bmp |
| WHAT? | fig0004.bmp |
| HOWDY | fig0005.bmp |
| I AM SURPRISE | fig0006.bmp |
| HI | fig0007.bmp |
| DID YOU CALL ME? | fig0008.bmp |

FIG. 10

SYSTEM:"WHAT IS YOUR FAVOTRITE FOOD, MASTER?"
USER:"PEANUTS."

FIG. 18

SYSTEM:"ARE YOU REALLY THE MASTER? WHAT IS YOUR FAVORITE FOOD?"
USER:"PEANUTS."
SYSTEM:"YOU ARE REALLY THE MASTER!"

FIG. 19

| ACTOR | TYPE | DESCRIPTION |
|---|---|---|
| USER | GREETING | GOOD DAY |
| SYSTEM | GREETING | HI |
| USER | QUERY | HOW ARE YOU? |
| SYSTEM | STATE | I AM FINE |

| ACTOR | TYPE | DESCRIPTION |
|---|---|---|
| SYSTEM | IMPRESSION | BORING |
| USER | STATE | I AM HUNGRY |
| SYSTEM | GREETING | GOOD DAY |
| USER | GREETING | HI |

| USER INPUT | USED KEYWORD | VARIATIONS IN EMOTION VARIABLES |
|---|---|---|
| DIRTY CURRY BREAD | DIRTY | ANGER:+5, SADNESS:+5, JOY:-15, FEAR:-5, SURPRISE:+5 AND HATRED:+20 |
| GOOD KID | GOOD | ANGER:-1, SADNESS:+2, JOY:+20, FEAR:-5, SURPRISE:+5 AND HATRED:-1 |
| AGAIN, DIRTY CURRY BREAD | DIRTY | ANGER:+5, SADNESS:+5, JOY:-15, FEAR:-5, SURPRISE:+5 AND HATRED:+20 |
| ... | ... | ... |

| | KEYWORD | | | | |
|---|---|---|---|---|---|
| | GOOD | BAD | HEY | DIRTY | CURRY BREAD |
| ANGER | −1 | +10 | +5 | +5 | +5 |
| SADNESS | +2 | +10 | +5 | +5 | +5 |
| JOY | +20 | −10 | −10 | −15 | −15 |
| FEAR | −5 | +5 | +10 | −5 | −5 |
| SURPRISE | +5 | −1 | +10 | +5 | +5 |
| HATRED | −1 | +5 | +2 | +20 | +20 |

(VARIATIONS IN VARIABLE VALUE)

| | KEYWORD | | | |
|---|---|---|---|---|
| | GOOD | BAD | HEY | DIRTY |
| ANGER | −1 | +10 | +5 | +4 |
| SADNESS | +2 | +10 | +5 | +4 |
| JOY | +20 | −10 | −10 | −13 |
| FEAR | −5 | +5 | +10 | −4 |
| SURPRISE | +5 | −1 | +10 | +4 |
| HATRED | −1 | +5 | +2 | +16 |

(VARIATIONS IN VARIABLE VALUE)

FIG. 27

INFORMATION PROCESSING APPARATUS, PORTABLE DEVICE, ELECTRONIC PET APPARATUS RECORDING MEDIUM STORING INFORMATION PROCESSING PROCEDURES AND INFORMATION PROCESSING METHOD

TECHNICAL FIELD

The present invention relates to an information processing apparatus, a portable device, an electronic pet apparatus, recording medium storing information processing procedures and an information processing method, and can be applied to various kinds of information device such as mobile telephones and personal computers. By exchanging various kinds of data required in generation of a response via a network and by using voice to catalogue words, the present invention realizes a more familiar electronic pet apparatus, an information processing apparatus with an electronic pet, a portable device and a recording medium storing information processing procedures.

BACKGROUND ART

For conventional personal computers, so-called rearing simulation game software has been proposed. The rearing simulation game software is a game to rear a pet (that is, an electronic pet) in a virtual reality space provided by a computer. The pet rearing simulation game software allows easy communications with an electronic pet in comparison with really rearing a pet.

By the way, a real pet performs various kinds of action depending to the physical condition thereof, the surrounding environment and so on. In addition, the pet recognizes the owner and performs actions different from actions to others. Moreover, the behavior may be changed by learning.

If an electronic pet is capable of imitating a variety of behaviors of a real pet, the electronic pet can be considered to be more familiar.

DISCLOSURE OF INVENTION

It is an object of the present invention addressing the problems described above to provide a more familiar electronic pet apparatus, an information processing apparatus with an electronic pet, a portable device, a recording medium storing information processing procedures and an information processing method.

In order to solve the problems described above, the present invention is applied to an information processing apparatus, a portable device or an electronic pet apparatus, and relating to: a voice recognition means for outputting a result of voice recognition in conformity with a predetermined recognition rule; an emotion generation means for generating an emotion parameter, which varies at least in accordance with the result of voice recognition and the lapse of time and indicates an emotion in a pseudo manner, in conformity with a predetermined emotion-parameter generation rule; and a response generation means for generating a response to the result of voice recognition in conformity with a predetermined response generation rule based on at least the emotion parameter, the following means is included: a communication means for carrying out processing to update the recognition rule, the emotion-parameter generation rule and the response generation rule by connection to a predetermined network; or a communication means for carrying out processing to update data required in the recognition rule, the emotion-parameter generation rule and the response generation rule by connection to the predetermined network.

In addition, the present invention is applied to an information processing apparatus, a portable device or an electronic pet apparatus, and also includes a communication means for acquiring at least the emotion parameter or data required in generation of the emotion parameter by connection to a predetermined network wherein the response generation means generates a response depending on the emotion parameter acquired by the communication means or a response depending on an emotion parameter generated from the data acquired by the communication means.

Furthermore, the present invention also provides a recording medium storing information processing procedures including: communication processing to execute a process to update the recognition rule, the emotion-parameter generation rule or the response generation rule by connection to a predetermined network; or communication processing to execute a process to update data required for the recognition rule, the emotion-parameter generation rule or the response generation rule by connection to the predetermined network.

Moreover, the present invention also provides a recording medium storing information processing procedures including: communication processing to acquire at least the emotion parameter or data required in generation of the emotion parameter by connection to a predetermined network from equipment of the same type connected to the network; and response generation processing to generate a response depending on the emotion parameter acquired by the communication processing or a response depending on an emotion parameter generated from the data acquired by the communication processing.

Further, the present invention is applied to an information processing method and comprises: communication processing to execute a process to update the recognition rule, the emotion-parameter generation rule or the response generation rule by connection to a predetermined network; or communication processing to execute of a process to update data required for the recognition rule, the emotion-parameter generation rule or the response generation rule by connection to the predetermined network.

In addition, the present invention is applied to an information processing method and comprises: communication processing to acquire at least the emotion parameter or data required in generation of the emotion parameter by connection to a predetermined network; and response generation processing to output a response depending on the emotion parameter acquired by the communication processing or a response depending on an emotion parameter generated from the data acquired by the communication processing.

Moreover, the present invention is applied to an information processing apparatus, a portable device or an electronic pet apparatus, includes a cataloging means capable of changing a data base via voice, on the basis of a result of voice recognition by at least cataloging a word obtained as a result of voice recognition in the data base in a cataloging operation mode.

Furthermore, the present invention also provides a recording medium storing information processing procedures including cataloging processing capable of changing a data base via voice the basis of a result of voice recognition by at least cataloging a word obtained as a result of voice recognition in the data base in a cataloging operation mode.

Furthermore, the present invention is applied to an information processing method and comprises cataloging processing capable of changing a data base via voice on the basis of a result of voice recognition by at least cataloging a word obtained as a result of voice recognition in the data base in a cataloging operation mode.

In addition, as an application to an information processing apparatus, a portable device or an electronic pet apparatus, the present invention has a user authentication means for authenticating the user on the basis of voice wherein the response generation means changes a response in accordance with the user and in dependence on a result of authentication output by the user authentication means.

Furthermore, the present invention also provides a recording medium storing information processing procedures including user authentication processing of authenticating the user on the basis of voice and response generation processing of changing a response in accordance with the user and in dependence on a result of authentication output by the user authentication processing.

Furthermore, as an application to an information processing method, the present invention comprises user authentication processing of authenticating the user on the basis of voice and response generation processing of changing a response in accordance with the user and in dependence on a result of authentication output by the user authentication processing.

In addition, as an application to an information processing apparatus, a portable device or an electronic pet apparatus, the present invention has a word/phrase classification means for identifying the type of an input expressed by voice in generation of a response to a result of voice recognition wherein a response generation rule is set as a rule for generating responses excluding a response of a predetermined type in accordance with the type of the voice input and on the basis of classification of responses according to classification of voice inputs.

Furthermore, the present invention also provides a recording medium storing, on the basis of the voice input, an information processing procedure prescribing word/phrase classification processing to identify the type of an input expressed by a voice in generation of a response to a result of voice recognition processing to set a response generation rule as a rule for generating responses excluding a response of a predetermined type in accordance with the type of the voice input and on the basis of classification of responses according to classification of voice inputs.

Further, as an application to an information processing method, the present invention comprises information processing procedure for recognizing the type of voice input and generating a response to the result of voice recognition in accordance with the predetermined response generation rule which is a rule of generating responses excluding a response of a predetermined type in accordance with the type of an input and a category of a response to the input.

In addition, as an application to an information processing apparatus, a portable device or an electronic pet apparatus, the present invention has a history recording means for recording a history of at least results of voice recognition and emotion parameters corresponding to results of voice recognition wherein a change in emotion parameter corresponding to a result of voice recognition is varied in accordance with the history.

Furthermore, the present invention also provides a recording medium storing information processing procedures prescribing history recording processing to record a history of at least results of voice recognition and emotion parameters corresponding to results of voice recognition to vary a change in emotion parameter corresponding to a result of voice recognition in accordance with the history.

On the top of that, as an application to an information processing method, the present invention comprises history recording processing to record a history of at least results of voice recognition and emotion parameters corresponding to results of voice recognition to vary a change in emotion parameter corresponding to a result of voice recognition in accordance with the history.

In addition, as an application to an information processing apparatus, a portable device or an electronic pet apparatus, the present invention relates to: a voice recognition means for processing a voice and outputting a result of voice recognition in conformity with a predetermined recognition rule; an emotion generation means for generating an emotion parameter, which indicates an emotion in a pseudo manner as well as varies at least in accordance with the result of voice recognition and varies with the lapse of time, in conformity with a predetermined emotion-parameter generation rule; and a response generation means for generating a response to a result of voice recognition in conformity with a predetermined response generation rule based on at least the emotion parameter, wherein there is included: a communication means for carrying out processing to update the recognition rule, the emotion-parameter generation rule and the response generation rule by connection to a predetermined network; or a communication means for carrying out processing to update data required in the recognition rule, the emotion-parameter generation rule and the response generation rule by connection to the predetermined network.

Accordingly, the communication means is capable of outputting various kinds of data required in the generation of a response. Thus, equipment of the same type connected to the network is capable of generating almost the same response as a response to a voice input in this information processing apparatus, the portable device or the electronic pet apparatus. As a result, an electronic pet can be treated as if the electronic pet were taken out to the external equipment connected to the network and, moreover, the electronic pet can also be made easy to get acquainted with as if the electronic pet were a real pet in the course of actual training.

In addition, as an application to an information processing apparatus, a portable device or an electronic pet apparatus, the present invention includes a communication means for acquiring at least an emotion parameter or data required in generation of an emotion parameter by connection to a predetermined network wherein the response generation means generates a response depending on the emotion parameter acquired by the communication means or a response depending on an emotion parameter generated from the data acquired by the communication means. Thus, the response generation means is capable of generating almost the same response as a response to a voice input in equipment of the same type connected to the network. As a result, an electronic pet can be treated as if the electronic pet were taken out from the equipment of the same type connected to the network and, moreover, the electronic pet can be made easy to get acquainted with as if the electronic pet were a real pet in the course of actual training. In addition, the amount of knowledge can be enlarged if necessary typically by making the vocabulary of words that can be understood by the electronic pet larger.

Furthermore, the present invention also provides a recording medium storing information processing procedures prescribing: communication processing to execute a process to update the recognition rule, the emotion-parameter generation rule or the response generation rule by connection to a predetermined network; or communication processing to execute a process to update data required for the recognition rule, the emotion-parameter generation rule or the response generation rule by connection to the predetermined network.

Thus, equipment of the same type connected to the network is capable of generating almost the same response as a response to voice input in an apparatus executing the information processing procedure stored in this recording medium. As a result, an electronic pet can be treated as if the electronic pet were taken out to the external equipment and, furthermore, the electronic pet can be made easy to get acquainted with as if the electronic pet were a real pet in the course of actual training.

Moreover, the present invention also provides a recording medium storing information processing procedures prescribing: communication processing to acquire at least an emotion parameter or data required in generation of an emotion parameter by connection to a predetermined network; and response generation processing to generate a response depending on the emotion parameter acquired by the communication processing or a response depending on an emotion parameter generated from the data acquired by the communication processing.

Thus, an apparatus executing the information processing procedure stored in this recording medium is capable of generating almost the same response as a response to a voice input in the equipment of the same type connected to the network. As a result, an electronic pet can be treated as if the electronic pet were taken out from the equipment of the same type connected to the network and, moreover, the electronic pet can be made easy to get acquainted with as if the electronic pet were a real pet in the course of actual training. In addition, the amount of knowledge can be enlarged if necessary typically by making the vocabulary of words that can be understood by the electronic pet larger.

On the top of that, as an application to an information processing method, the present invention comprises: communication processing to execute a process to update the recognition rule, the emotion-parameter generation rule or the response generation rule by connection to a predetermined network; or communication processing to execute a process to update data required for the recognition rule, the emotion-parameter generation rule or the response generation rule by connection to a predetermined network.

Thus, equipment of the same type connected to the network is capable of generating almost the same response as a response to a voice input in an apparatus executing the information processing method. As a result, an electronic pet can be treated as if the electronic pet were taken out to the external equipment and, furthermore, the electronic pet can be made easy to get acquainted with as if the electronic pet were a real pet in the course of actual training.

In addition, as an application to an information processing method, the present invention comprises: communication processing to acquire at least the emotion parameter or data required in generation of the emotion parameter by connection to a predetermined network; and response generation processing to generate a response depending on the emotion parameter acquired by the communication processing or a response depending on an emotion parameter generated from the data acquired by the communication processing.

Thus, an apparatus executing this information processing method is capable of generating almost the same response as a response to a voice input in the equipment of the same type connected to the network. As a result, an electronic pet can be treated as if the electronic pet were taken out from the equipment connected to the network and, moreover, the electronic pet can be made easy to get acquainted with as if the electronic pet were a real pet in the course of actual training. In addition, the amount of knowledge can be enlarged if necessary typically by making the vocabulary of words that can be understood by the electronic pet larger.

Moreover, as an application to an information processing apparatus, a portable device or an electronic pet apparatus, the present invention has a cataloging means capable of changing a data base in accordance with a voice input in a cataloging operation mode based on a result of voice recognition by at least cataloging a word obtained as a result of voice recognition in the data base. Thus, the vocabulary of words that can be understood by an electronic pet can be made larger with ease by voice inputs. As a result, the electronic pet can be made easy to get acquainted with as if the electronic pet were a real pet in the course of actual training.

Furthermore, the present invention also provides a recording medium storing information processing procedures prescribing cataloging processing capable of changing a data base in accordance with a voice input in a cataloging operation mode based on a result of voice recognition by at least cataloging a word obtained as a result of voice recognition in the data base.

Thus, the vocabulary of words that can be understood by an electronic pet can be made larger with ease by voice inputs in an apparatus executing the information processing procedure stored in this recording medium. As a result, the electronic pet can be made easy to get acquainted with as if the electronic pet were a real pet in the course of actual training.

On the top of that, as an application to an information processing method, the present invention comprises cataloging processing capable of changing a data base in accordance with a voice input in a cataloging operation mode based on a result of voice recognition by at least cataloging a word obtained as a result of voice recognition in the data base. By executing this information processing method, the vocabulary of words that can be understood by an electronic pet can thus be made larger with ease by voice inputs. As a result, the electronic pet can be made easy to get acquainted with as if the electronic pet were a real pet in the course of actual training.

In addition, as an application to an information processing apparatus, a portable device or an electronic pet apparatus, the present invention has a user authentication means for authenticating the user wherein the response generation means changes a generated response in accordance with the user and in dependence on a result of authentication output by the user authentication means. Thus, the response of an electronic pet to the owner can be made different for example from that to a person other than the owner. As a result, the electronic pet can be made a pet which is easier to get acquainted with and behaves as if the electronic pet were a real pet.

Furthermore, the present invention also provides a recording medium storing information processing procedures prescribing user authentication processing of authenticating the user and response generation processing of changing a generated response in accordance with the user and in dependence on a result of authentication output by the user authentication processing. Thus, the response of an electronic pet to the owner can be made different for example from that to a person other than the owner. As a result, the electronic pet can be made a pet which is easier to get acquainted with and behaves as if the electronic pet were a real pet.

On the top of that, as an application to an information processing method, the present invention comprises user authentication processing of authenticating the user and response generation processing of changing a generated response in accordance with the user and in dependence on a result of authentication output by the user authentication processing. Thus, the response of an electronic pet to the owner can be made different for example from that to a person other than the owner. As a result, the electronic pet can be made a pet which is easier to get acquainted with and behaves as if the electronic pet were a real pet.

In addition, as an application to an information processing apparatus, a portable device or an electronic pet apparatus, the present invention has a word/phrase classification means for identifying the type of an input expressed by a voice in generation of a response to a result of voice recognition wherein a response generation rule is set as a rule for generating responses excluding a response of a predetermined type in accordance with the type of the voice input and on the basis of classification of responses according to classification of voice inputs. It is thus possible to prevent an electronic pet from outputting an unnatural response such as a question raised in response to an inquiry. As a result, the response of the electronic pet can be made natural as well as lively. In addition, the electronic pet can be made easier to get acquainted with.

Furthermore, the present invention also provides a recording medium storing information processing procedures prescribing word/phrase classification processing to identify the type of an input expressed by a voice in generation of a response to a result of voice recognition processing to set a response generation rule as a rule for generating responses excluding a response of a predetermined type in accordance with the type of the voice input and on the basis of classification of responses according to classification of voice inputs. It is thus possible to prevent an electronic pet from outputting an unnatural response such as a question raised in response to an inquiry. As a result, the response of the electronic pet can be made natural as well as lively. In addition, the electronic pet can be made easier to get acquainted with.

On the top of that, as an application to an information processing method, the present invention comprises information processing procedure for recognizing the type of voice input and generating a response to the result of voice recognition in accordance with the predetermined response generation rule which is a rule of generating responses excluding a response of a predetermined type in accordance with the type of an input and a category of a response to the input. It is thus possible to prevent an electronic pet from outputting an unnatural response such as a question raised in response to an inquiry. As a result, the response of the electronic pet can be made natural as well as lively. In addition, the electronic pet can be made easier to get acquainted with.

In addition, as an application to an information processing apparatus, a portable device or an electronic pet apparatus, the present invention has a history recording means for recording a history of at least results of voice recognition and emotion parameters corresponding to results of voice recognition wherein a change in emotion parameter corresponding to a result of voice recognition is varied in accordance with the history. It is thus possible to create an electronic pet's response full of emotions of familiarity, intimacy and the like to for example a voice heard frequently. As a result, the response of the electronic pet can be made natural as well as lively. In addition, the electronic pet can be made easier to get acquainted with.

Furthermore, the present invention also provides a recording medium storing information processing procedures prescribing history recording processing to record a history of at least results of voice recognition and emotion parameters corresponding to results of voice recognition to vary a change in emotion parameter corresponding to a result of voice recognition in accordance with the history. It is thus possible to create an electronic pet's response full of emotions of familiarity, intimacy and the like to for example a voice heard frequently. As a result, the response of the electronic pet can be made natural as well as lively. In addition, the electronic pet can be made easier to get acquainted with.

On the top of that, as an application to an information processing method, the present invention comprises history recording processing to record a history of at least results of voice recognition and emotion parameters corresponding to results of voice recognition to vary a change in emotion parameter corresponding to a result of voice recognition in accordance with the history. It is thus possible to create an electronic pet's response full of emotions of familiarity, intimacy and the like to for example a voice heard frequently. As a result, the response of the electronic pet can be made natural as well as lively. In addition, the electronic pet can be made more familiar.

BRIEF DESCRIPTION OF DRAWINGS

FIG. 4 shows a table of data representing the physical condition.

FIG. 5 shows a table of data representing an emotion.

FIG. 6 shows a table of character data.

FIG. 7 shows a table of data representing a changed emotion.

FIG. 9 shows a table of files each containing voice data.

FIG. 10 shows a table of files each containing picture data.

FIG. 18 shows a typical dialog to know a favorite of the user to be used later in authentication of the user.

FIG. 19 shows a typical dialog to authenticate the user by using the favorite obtained during the conversation shown in FIG. 18.

FIG. 22 shows a typical conversation history.

FIG. 23 shows another typical conversation history.

FIG. 25 is a table of variations in emotions (character data) for different keywords each included in a user voice input.

FIG. 26 is a table summarizing the variations in emotions (character data) shown in FIG. 25.

FIG. 27 is a table summarizing changed variations in emotions (character data).

BEST MODE FOR CARRYING OUT THE INVENTION

1. First Embodiment 1-1. Overall Configuration of the First Embodiment

Figure 2:
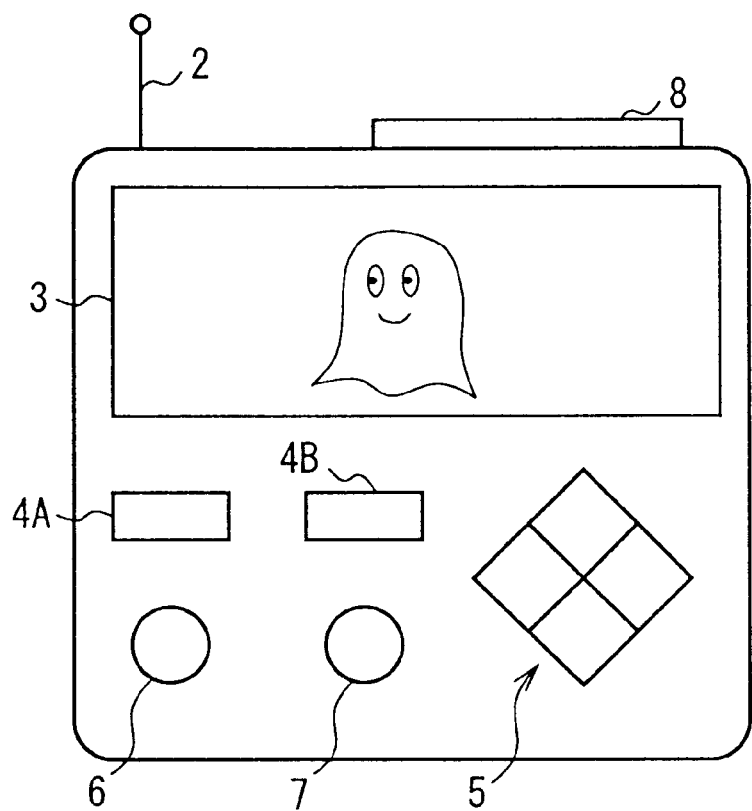
FIG. 2 is a diagram showing a front view of the electronic pet apparatus shown in FIG. 1.

FIG. 2 is a diagram showing a front view of an electronic pet apparatus 1 implemented by a first embodiment of the present invention. As shown in the figure, the electronic pet apparatus 1 includes an antenna 2 which can be pulled out upward and a liquid-crystal display panel 3 on the upper portion of the front surface. The liquid-crystal display panel 3 employed in the electronic pet apparatus 1 displays the figure of an electronic pet and a message issued by the electronic pet. Under the liquid-crystal display panel 3, the electronic pet apparatus 1 includes a confirm operator 4A, a cancel operator 4B and a cursor operator 5. These operators are operated to change the operating mode and to accomplish other purposes.

The electronic pet apparatus 1 further includes a speaker 6 and a microphone 7 beneath the confirm and cancel operators 4A and 4B respectively. A conversation can be held with the electronic pet through the speaker 6 and the microphone 7. Furthermore, the electronic pet apparatus 1 has a socket on the rear surface. The socket allows an IC card 8 to be mounted on the electronic pet apparatus 1.

Figure 3:
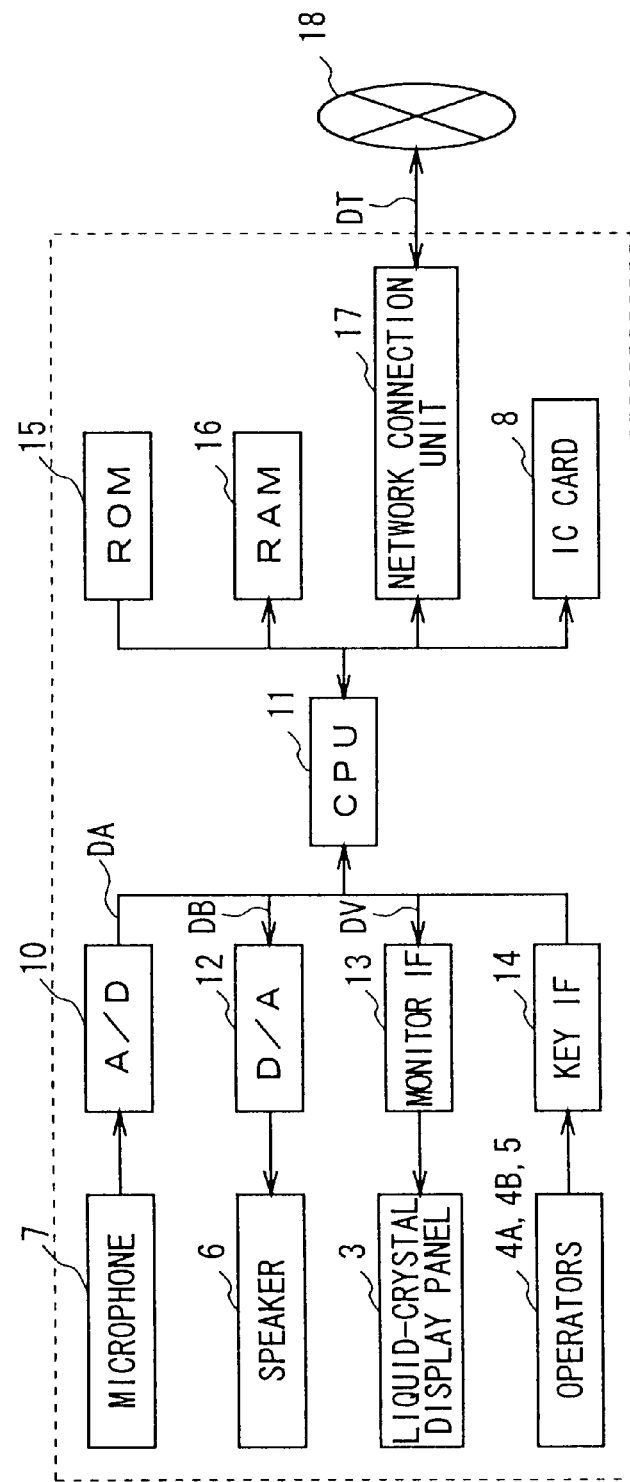
FIG. 3 is a hardware block diagram showing the electronic pet apparatus of FIG. 1.

FIG. 3 is a block diagram showing hardware of the electronic pet apparatus 1. As shown in the figure, the electronic pet apparatus 1 includes an analog-to-digital (A/D) conversion circuit 10 for converting an audio analog signal coming from the microphone 7 by way of an amplifier circuit not shown in the figure into digital audio data DA. The analog-to-digital conversion circuit 10 outputs the digital audio data DA to a central processing unit (CPU) 11. In this way, the electronic pet apparatus 1 is capable of processing a voice entered by the user by using the central processing unit 11.

On the other hand, a digital-to-analog (D/A) conversion circuit 12 converts digital audio data DB produced by the central processing unit 11 into an analog audio signal which is output to the speaker 6. In this way, the user is capable of verifying a voice of the electronic pet generated by the electronic pet apparatus 1 to express a response generated by the electronic pet.

Controlled by the central processing unit 11, a monitor interface (monitor I/F) 13 drives the liquid-crystal display panel 3 to display a picture of the electronic pet on the liquid-crystal display panel 3 in accordance with picture data DV coming from the central processing unit 11 by way of a bus.

A key interface (key I/F) 14 detects an operation carried out by the user on the operator 4A, 4B or 5, supplying a detection signal to the central processing unit 11. A read-only memory (ROM) 15 is used for storing information such as a processing program to be executed by the central processing unit 11 and various kinds of data necessary for an analysis of a voice acquired through the microphone 7. The central processing unit 11 reads out information from the read-only memory 15 to be output also under control executed by the central processing unit 11. A random-access memory (RAM) 16 serves as a work area of the central processing unit 11. The random-access memory 16 is used for temporarily storing various kinds of data necessary for processing carried out by the central processing unit 11.

Controlled by the central processing unit 11, a network connection unit 17 connects the electronic pet apparatus 1 to a predetermined network 18 through a telephone line. The electronic pet apparatus 1 exchanges various kinds of data DT with the network 18 and, when necessary, updates information such as contents of the random-access memory 16 by using the exchanged data. To put it in detail, the electronic pet apparatus 1 is thus capable of acquiring various kinds of data required for training and nurturing the electronic pet from the network 18 when necessary. In addition, data stored in the random-access memory 16 may be transmitted to a desired terminal by way of the network 18. As a result, the electronic pet can be treated as if the pet were taken out to a variety of environments by exporting data to terminals connected to the network 18. On the contrary, an electronic pet of another apparatus connected to the terminal 18 can be trained by using this electronic pet apparatus.

The IC card 8 is an external recording device that can be mounted and dismounted. If necessary, data stored in the IC card is used for updating information such as the contents of the random-access memory 16, or data stored in the random-access memory 16 can be transferred to the IC card 8. In this way, the electronic pet apparatus 1 is capable of exchanging various kinds of data with other equipment through the IC card 8, making it possible to acquire various kinds of data necessary for training and nurturing of the electronic pet. In addition, the electronic pet can be treated as if the pet were taken out to a variety of environments and, on the contrary, an electronic pet of another apparatus can be trained by using this electronic pet apparatus 1.

Figure 1:
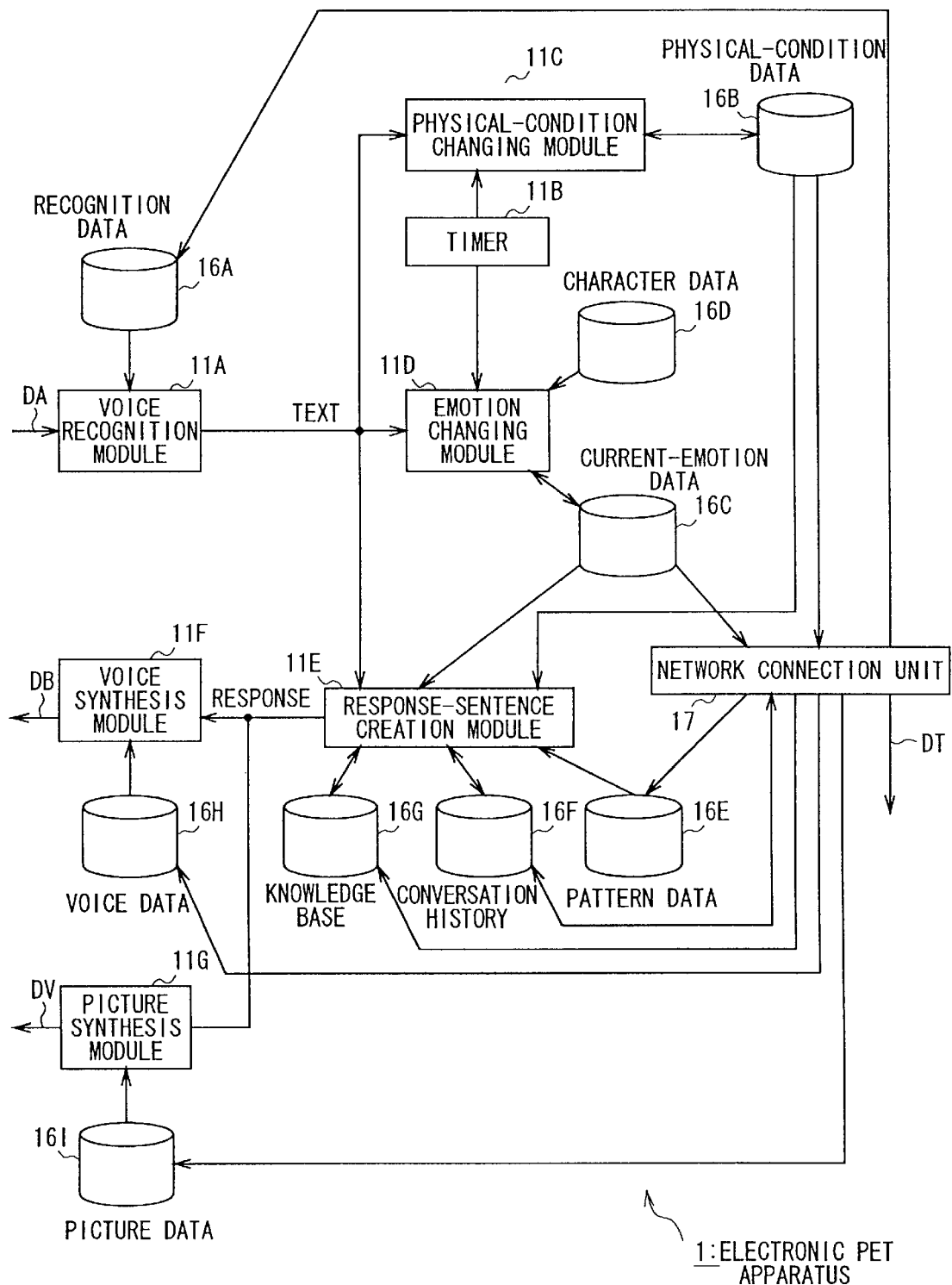
FIG. 1 is a functional block diagram showing an electronic pet apparatus as implemented by an embodiment of the present invention.

FIG. 1 is a block diagram showing a basic configuration of the electronic pet apparatus 1 in terms of functional blocks. It should be noted that rectangular functional blocks shown in FIG. 1 each represent a processing program stored in the read-only memory 15 to be executed by the central processing unit 11. On the other hand, a functional block drawn as a symbol of a magnetic disc represents data stored in the read-only memory 15, the random-access memory 16 or the IC card 8.

A voice recognition module 11A employed in the electronic pet apparatus 1 carries out a voice recognition processing on audio data DA in conformity with a predetermined recognition rule, generating a result of voice recognition as an output. To put it in detail, the voice recognition module 11A delimits voice represented by the sequentially received audio data DA by phonemes in accordance with a HMM (Hidden Marcov Model) method. The voice recognition module 11A references recognition data 16A for a series of such phonemes. The voice recognition module 11A produces words of the audio data DA, words of a phrase cataloged in advance and, in the case of a phrase, words of the phrase or text data representing the phrase on the basis of results of the reference to the recognition data 16A as results of recognition. The recognition data 16A is a data base associating text data of words and phrases with a series of phonemes output by the HMM method. That is to say, the recognition data 16A is a data base used for storing pairs each comprising text data and a phoneme. Such a data base allows the electronic pet apparatus 1 to convert a voice of "A Good kid" said by the user in front of the microphone 7 into an array of characters representing a text of "A Good kid." As a result, a voice input is converted into an array of characters.

A timer 11B invokes components such as a physical-condition changing module 11C and an emotion changing module 11D at predetermined intervals.

When activated by the timer 11B, the physical-condition changing module 11C updates physical-condition data 16B in accordance with a result of voice recognition. The physical-condition data 16B includes parameters representing the present physical condition of the electronic pet. It should be noted that, in the case of this embodiment, the physical-condition data 16B comprises 5 parameters called "fatigue", "hunger", "thirstiness", "sickness" and "sleepiness" respectively as shown in FIG. 4. The larger the value of a parameter, the greater the share of the parameter in the physical condition of the electronic pet. The typical values shown in FIG. 4 thus indicate that, at the present time, the electronic pet is extremely tired and very hungry.

As described above, the physical-condition changing module 11C updates the physical-condition data 16B in accordance with a result of voice recognition as activated by the timer 11B. For example, the "hunger", "thirstiness" and "sleepiness" parameters are increased gradually in conformity with the rule of nature as is generally seen in the course of typical nurturing of a real pet. As a result, the electronic pet gets hungry with the lapse of time. Another example of an operation to update the physical-condition data 16B in accordance with a result of voice recognition is an operation to decrease the "hunger" parameter when a result of voice recognition indicates that food has been given to the electronic pet. Still another example of an operation to update the physical-condition data 16B in accordance with a result of voice recognition is an operation to decrease the "thirstiness" parameter when a result of voice recognition indicates that a drink has been given to the electronic pet. A further example of an operation to update the physical-condition data 16B in accordance with a result of voice recognition is an operation to gradually increase the "fatigue" parameter when a result of voice recognition indicates that owner is playing with the electronic pet. A still further example of an operation to update the physical-condition data 16B in accordance with a result of voice recognition is an operation to gradually decrease the "sleepiness" parameter synchronously with a timer when a result of voice recognition indicates that the owner tells the electronic pet to sleep.

On the other hand, the emotion changing module 11D updates the present emotion data 16C in accordance with a result of voice recognition as activated by the timer 11B. The present emotion data 16C includes variables representing emotions of the current electronic pet in a pseudo manner. Such variables are each also referred to as a pseudo emotion parameter. It should be noted that, in the case of this embodiment, there are 6 pseudo emotion parameters which represent "anger", "sadness", "joy", "fear", "surprise" and "hatred" emotions respectively as shown in FIG. 5. The larger the value of a pseudo emotion parameter, the greater the emotion represented by the parameter. A typical set of values of pseudo emotion parameters shown in FIG. 5 indicate that, at the present time, the electronic pet is joyful but angry.

As described above, the emotion changing module 11D updates the emotion data 16C in conformity with the rule of nature as is generally seen in a the course of typical nurturing of a real pet. That is to say, when the emotion changing module 11D updates the emotion data 16C as activated by the timer 11B, the 6 variables, namely, the "anger", "sadness", "joy", "fear", "surprise" and "hatred" emotion parameters, are each gradually updated so as to approach a predetermined reference value. Thus, in the case of the example shown in FIG. 5, the "anger", the "sadness" and the other emotions are gradually settled.

When the emotion changing module 11D updates the emotion data 16C in accordance with a result of voice recognition, on the other hand, character data 16D is searched for information indicated by the result of voice recognition and the information is then used as a basis for updating the emotion data 16C.

As shown in FIG. 6, the character data 16D comprises changes in emotion data 16C classified by phrase (or word) included in a result of voice recognition. That is to say, by using a phrase included in a result of voice recognition as a keyword, the character data 16D can be searched for variations in emotion data 16C proper for the phrase (or the word). Assume for example that the user says: "Good" to the electronic pet. In this case, the "anger", "sadness", "joy", "fear", "surprise" and "hatred" emotion parameters are changed by −1, +2, +20, −5, +5 and −1 respectively as shown in FIG. 6. In other words, variations in emotion data 16C of −1, +2, +20, −5, +5 and −1 are assigned to the word "Good".

Thus, when the user says: "A Good kid," for example, the emotion changing module 11D updates the emotion data 16C shown in FIG. 5 to that shown in FIG. 7. In this way, the emotion changing module 11D serves as an emotion generation means which generates pseudo emotion parameters each representing an emotion in a pseudo manner and updates the emotion data on the basis of a predetermined emotion-parameter generation rule at least in accordance with a result of voice recognition. In addition, the pseudo emotion parameters also vary with the lapse of time.

Figure 8:
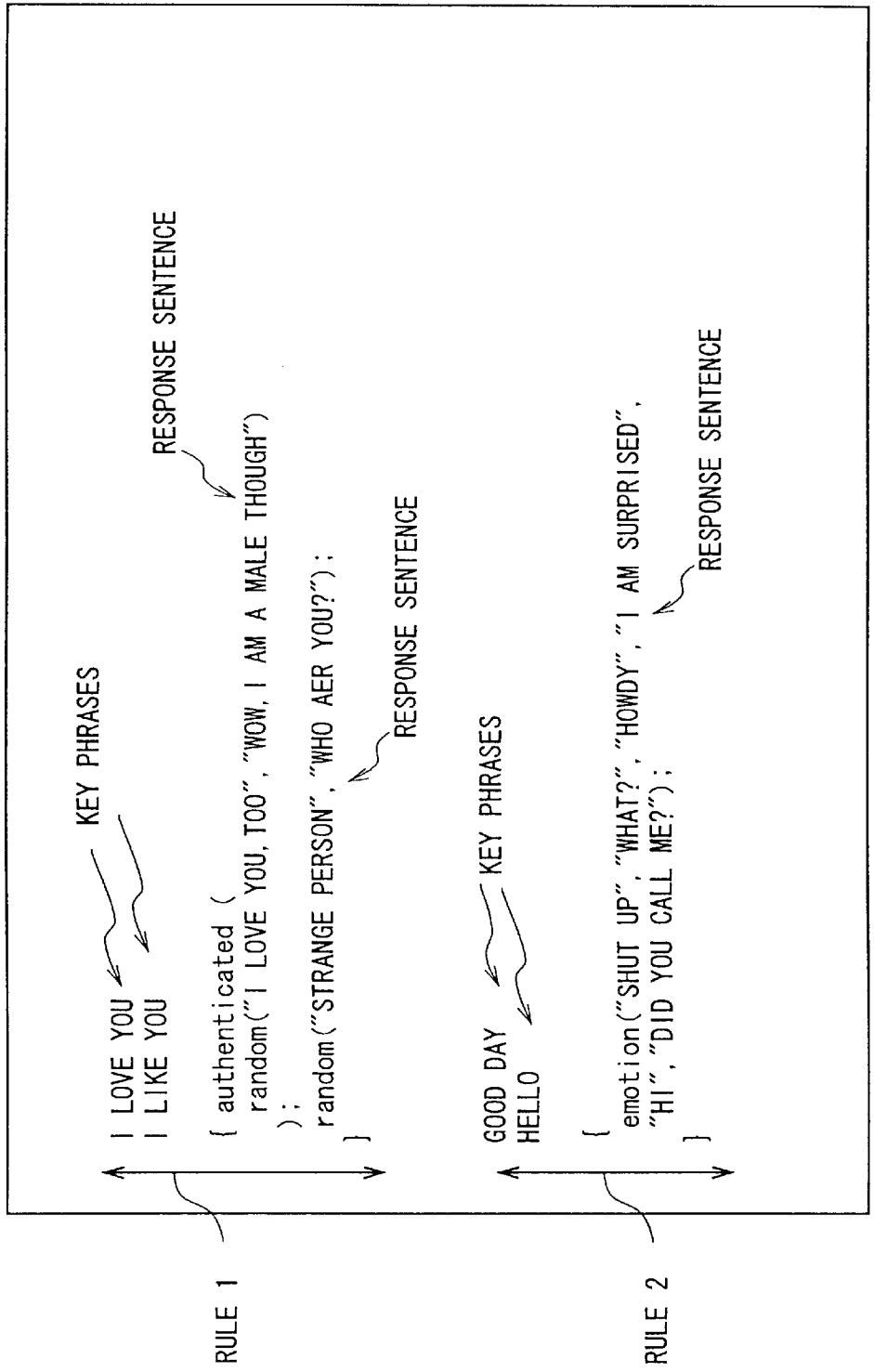
FIG. 8 shows rules described in pattern data.

A response-sentence creation module 11E generates a response to a result of voice recognition in accordance with predetermined response generation rules based on the physical-condition data 16B and the emotion data 16C. Pattern data 16E is a set of rules for generation of such a response. As shown in FIG. 8, each of the rules describes a response to an input key phrase which includes a word obtained as a result of voice recognition. Determined by a key phrase, a response described by a rule also varies in accordance with the emotion data 16C and the physical-condition data 16B. It should be noted that only minimum require rules are shown in FIG. 8 in order to make the explanation simple. Actual rules prescribe conditions (including attributes to be described later) other than the conditions shown in FIG. 8. Rule 2 shown in FIG. 8 is an example of a rule based on emotion data 16C only. It should be noted that a rule can be based on a combination of the emotion data 16C and the physical-condition data 16B.

Rule 1 shown in FIG. 8 prescribes response phrases to an input phrase "I love you" or "I like you." According to Rule 1, if the input phrase is a voice of an authenticated user, a response phrase saying: "I love you, too" or "Wow, I am a male though" is output at random. If the input phrase is not a voice of an authenticated user, on the other hand, a response phrase saying: "A strange person" or "Who are you?" is output at random.

Rule 2 shown in FIG. 8 prescribes response phrases to an input phrase "Good day" or "Hello." As described above, the response phrases are based on the "anger", "sadness", "joy", "fear", "surprise" and "hatred" emotions of the emotion data. To be more specific, a response phrase saying: "Shut up", "What?", "Howdy", "I am surprised", "Hi", or "Did you call me?" is selected as an output if the largest among the "anger", "sadness", "joy", "fear", "surprise" and "hatred" emotion parameters respectively exceeds a predetermined value.

The statement 'authenticated (A); (B)' in Rule 1 shown in FIG. 8 means that if a result of user authentication or the like to be described later is set at a Boolean value of "TRUE", the phrase (A) is selected and if the result of the user authentication or the like is not set at "TRUE", on the other hand, the phrase (B) is selected. The statement "random ("A", "B")" means that either the phase "A" or "B" is selected at random.

By the way, the "joy" emotion parameter in the typical emotion data 16C shown in FIG. 7 has the largest value among the variables. Thus, according to Rule 2, the word "Howdy" for the joy emotion is selected.

As the response-sentence creation module 11E creates a response based on the emotion data 16C described above, depending on the input key phrase, the response-sentence creation module 11E also creates a response based on the physical-condition data 16B or a combination of the emotion data 16C and the physical-condition data 16B as mentioned earlier. With such a response-sentence creation module 11E, when the electronic pet is in an unsatisfactory physical condition, the electronic pet apparatus 1 thus generates a response corresponding to the condition.

The response-sentence creation module 11E records a generated response to such a result of voice recognition in a conversation history 16F. If necessary, the response-sentence creation module 11E generates a response by referring to the conversation history 16F. In this way, an unnatural conversation between the electronic pet and the user can be avoided. In addition, the response-sentence creation module 11E also generates a response by referring to a knowledge base 16G. As a result, the electronic pet apparatus 1 is capable of changing the response in dependence on the user which is identified typically by carrying out processing to authenticate the user.

A voice synthesis module 11F searches voice data 16H for voice data DB corresponding to a response output by the response-sentence creation module 11E, outputting the voice data DB as a search result. As shown in FIG. 9, the voice data 16H is a collection of voice files each corresponding to a response. For example, when the response "Howdy" is output, a voice file named 'voice0005.wav' is selected and voice data DB recorded in this voice file is output.

A picture synthesis module 11G searches picture data 16I for picture data DV corresponding to a response output by the response-sentence creation module 11E, outputting the picture data DV as a search result. As shown in FIG. 10, the picture data 16I is a collection of picture-data files each corresponding to a response. For example, when the response "Howdy" is output, a picture-data file named 'fig0005.bmp' is selected and picture data DV recorded in this picture-data file is output.

1-2. Connection to the Network

Figure 11:
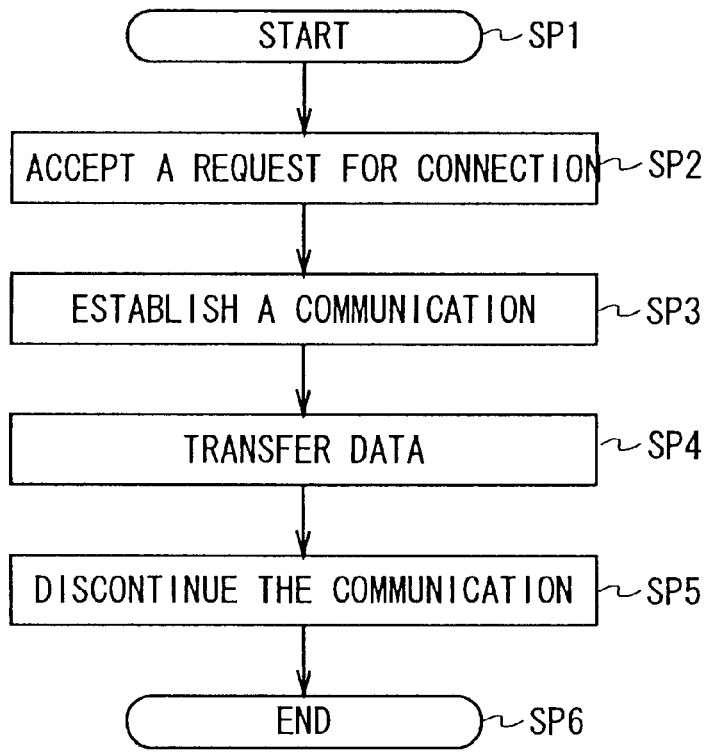
FIG. 11 shows a flowchart representing a connection processing procedure for connecting the electronic pet apparatus to a network.

The central processing unit 11 executes a processing procedure shown in FIG. 11 to connect the electronic pet apparatus 1 to the network 18 through the network connection unit 17. Connected to the network 18, the electronic pet apparatus 1 is capable of transmitting the physical-condition data 16B, the emotion data 16C and the conversation history 16F to desired equipment by way of the network 18. The equipment receiving such data from the electronic pet apparatus 1 is capable of reproducing the electronic pet of the electronic pet apparatus 1. In this way, the electronic pet can be taken out to a variety of environments.

On the contrary, the central processing unit 11 is capable of acquiring physical-condition data 16B, emotion data 16C and a conversation history 16F from the network 18, allowing an electronic pet raised in another electronic pet apparatus to be brought out to this electronic pet apparatus 1. In this case, the functional blocks of the electronic pet apparatus 1 are capable of carrying out the processing based on the native physical-condition data 16B, the native emotion data 16C and the native conversation history 16F to emulate its own electronic pet raised by itself in parallel to processing based on the physical-condition data 16B, the emotion data 16C and the conversation history 16F imported from the other electronic apparatus through the network 18 to emulate another electronic pet raised in the other electronic apparatus to produce responses as if the other electronic pet were visiting this electronic pet apparatus 1. It should be noted that, in the functional blocks shown in FIG. 1, flows of data in the processing based on the physical-condition data 16B, the emotion data 16C and the conversation history 16F acquired from the other electronic apparatus through the network 18 are not shown.

The electronic pet unit 1 is also capable of acquiring recognition data 16A, pattern data 16E, a knowledge base 16G, voice data 16H and picture data 16I from the network 18 to increase the size of the vocabulary of spoken words that can be recognized by the so-called electronic pet and to increase the number of response types. As a result, the electronic pet apparatus 1 is capable of raising and teaching the electronic pet.

As shown in FIG. 11, the procedure begins with a step SP1. In response to a request for connection, the flow of the procedure goes on to a step SP2 at which the central processing unit 11 accepts the request. It should be noted that such requests for connection are generated periodically by the timer 11B at fixed intervals. In addition, a request for connection can be made by the user by operating an operator. Furthermore, a connection can also be established in response to an incoming call from the network 18.

The flow of the procedure then goes on to a step SP3 at which the central processing unit 11 establishes a communication by carrying out predetermined line connection processing. Then, the flow of the procedure proceeds to a step SP4 at which the central processing unit 11 exchanges various kinds of data depending on the substance of the request for connection with a communication partner. Subsequently, the flow of the procedure proceeds to a step SP5 at which the central processing unit 11 cuts off the communication. Finally, the flow of the procedure proceeds to a step SP6 at which the central processing unit 11 ends the processing procedure.

Figure 12:
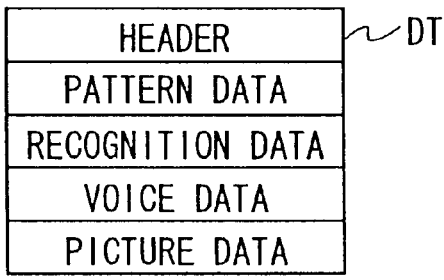
FIG. 12 is a diagram showing the format of data output to the network.

FIG. 12 is a diagram showing the format of transferred data. The electronic pet apparatus 1 exchanges data with a communication partner by way of an interface included in the network connection unit 17 and an interface in the communication partner in accordance with the format. As shown in the figure, each piece of data DT has a header for describing information such as the address and the type of the data DT. Typically, the data DT includes pattern data 16E, recognition data 16A, voice data 16H, picture data 16I and so on, which are arranged sequentially, as necessary.

1-3. Cataloging Recognition Data

Figure 13:
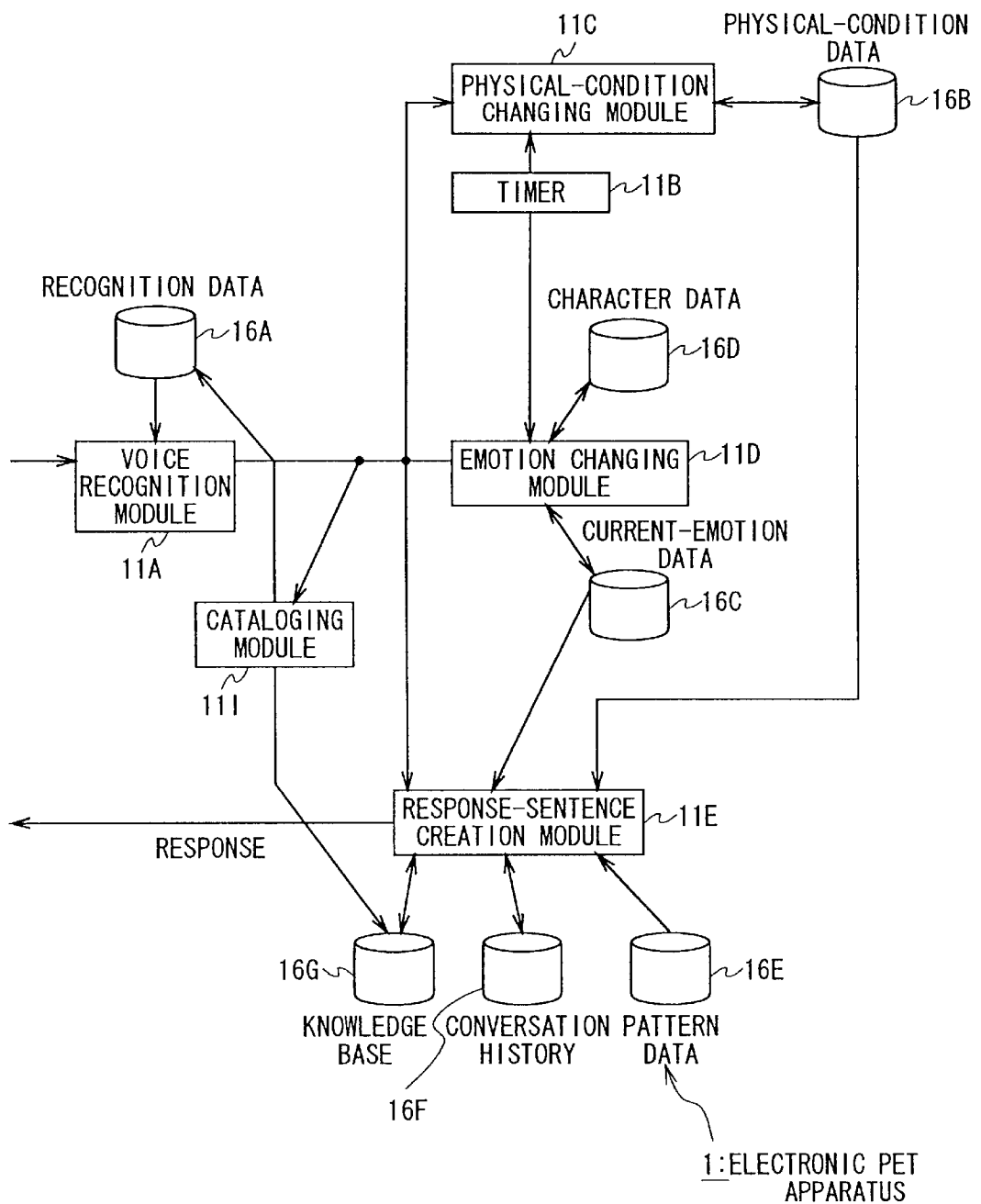
FIG. 13 is a functional block diagram showing the electronic pet apparatus in more detail in an operation to catalog recognition data.

FIG. 13 is a functional block diagram showing the electronic pet apparatus 1 in more detail in an operation to catalog recognition data 16A. In this functional block diagram, a cataloging module 11I catalogs a result of voice recognition as recognition data 16A. In this way, it is possible to teach the electronic pet a variety of words orally without entering the words via an input unit such as a keyboard.

In order to accomplish the purpose described above, the voice recognition module 11A processes voice data DA by adoption of the HMM method, outputting a series of phonemes as a result of voice recognition. To put it in detail, a voice expressed in the Japanese language is analyzed to identify its phonemes which are each indicated by an identifier. Thus, a pronunciation in the Japanese language can be expressed by an array of identifiers. The identifiers are listed as follows: 'b', 'd', 'g', 'p', 't', 'k', 'm', 'n', 'r', 'z', 'ch', 'ts', 'y', 'w', 'h', 'i', 'e', 'a', 'o', 'u', 'N', 'ei', 'ou', 's', 'sh', 'xy', 'j', 'f' and 'sil'. The phoneme 'sil' is soundless.

Figure 14:
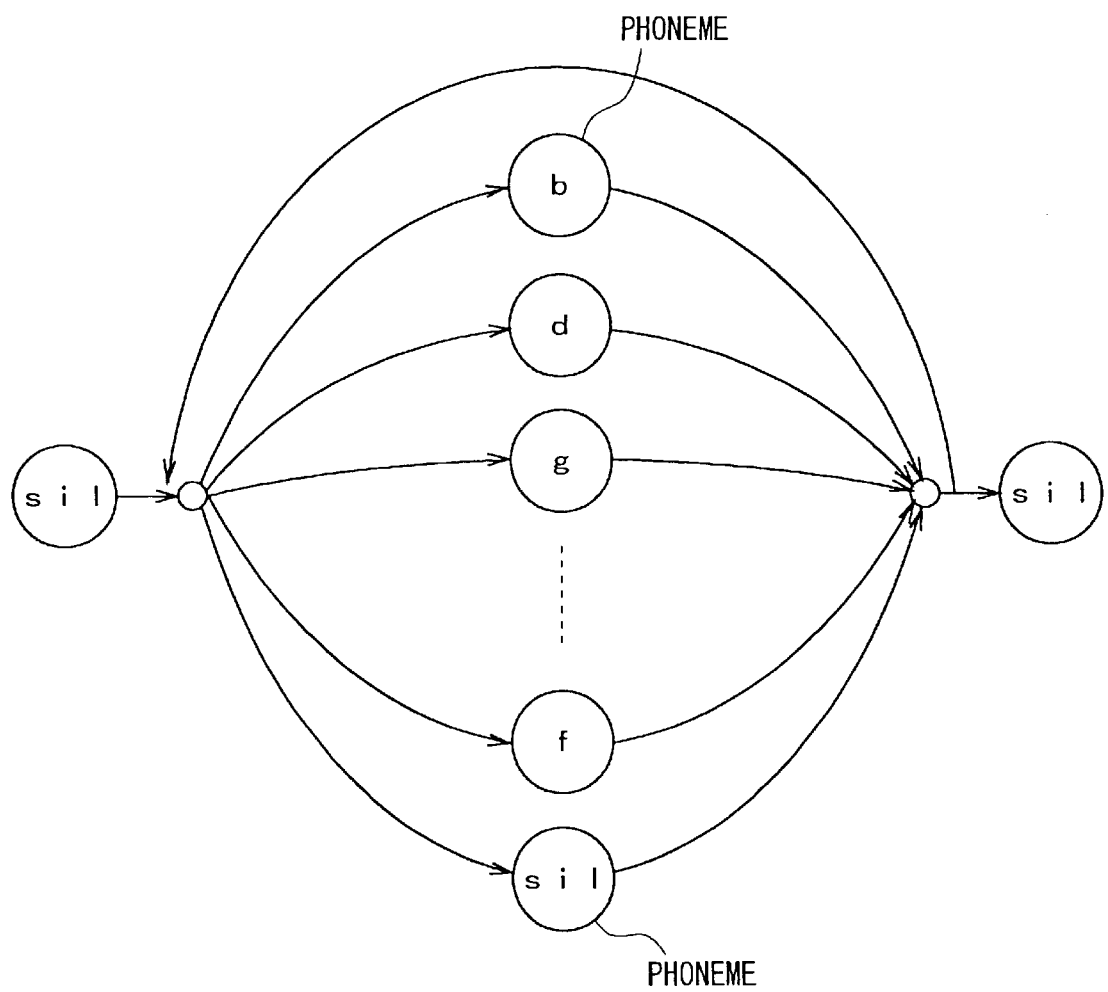
FIG. 14 is a diagram showing syntax of a voice input subjected to a voice recognition process.

When the user says: "mikan" ("oranges", in English) as an input, for example, the voice recognition module 11A recognizes the voice input as a series of phonemes which are expressed by identifiers 'sil m i k a N sil'. The voice recognition module 11A sequentially processes the voice data DA supplied thereto also sequentially to identify its phonemes. Results of recognition are then processed according to syntax shown in FIG. 14 to detect a series of phonemes represented by a series of identifiers. It should be noted that the syntax shown in FIG. 14 is syntax indicating permitted connections of all the phonemes listed above.

In a normal operating mode, the video recognition module 11A searches the recognition data 16A for text data including a word or a phrase obtained as a search result corresponding to an array of identifiers detected in this way, outputting the text data as a result of recognition. Thus, when a word not cataloged in the recognition data 16A is received from the user as a voice input in this embodiment, it will be difficult to generate text data and it is hence hard to give a correct response to a voice input given by the user.

In order to solve this problem, the electronic pet apparatus 1 implemented by this embodiment is connected to the network 18 by the network connection unit 17, being capable of downloading recognition data 16A from the network 18. In this way, the downloaded recognition data 16A is taught to the electronic pet so that the electronic pet is capable of giving responses to a variety of sayings.

Figure 15:
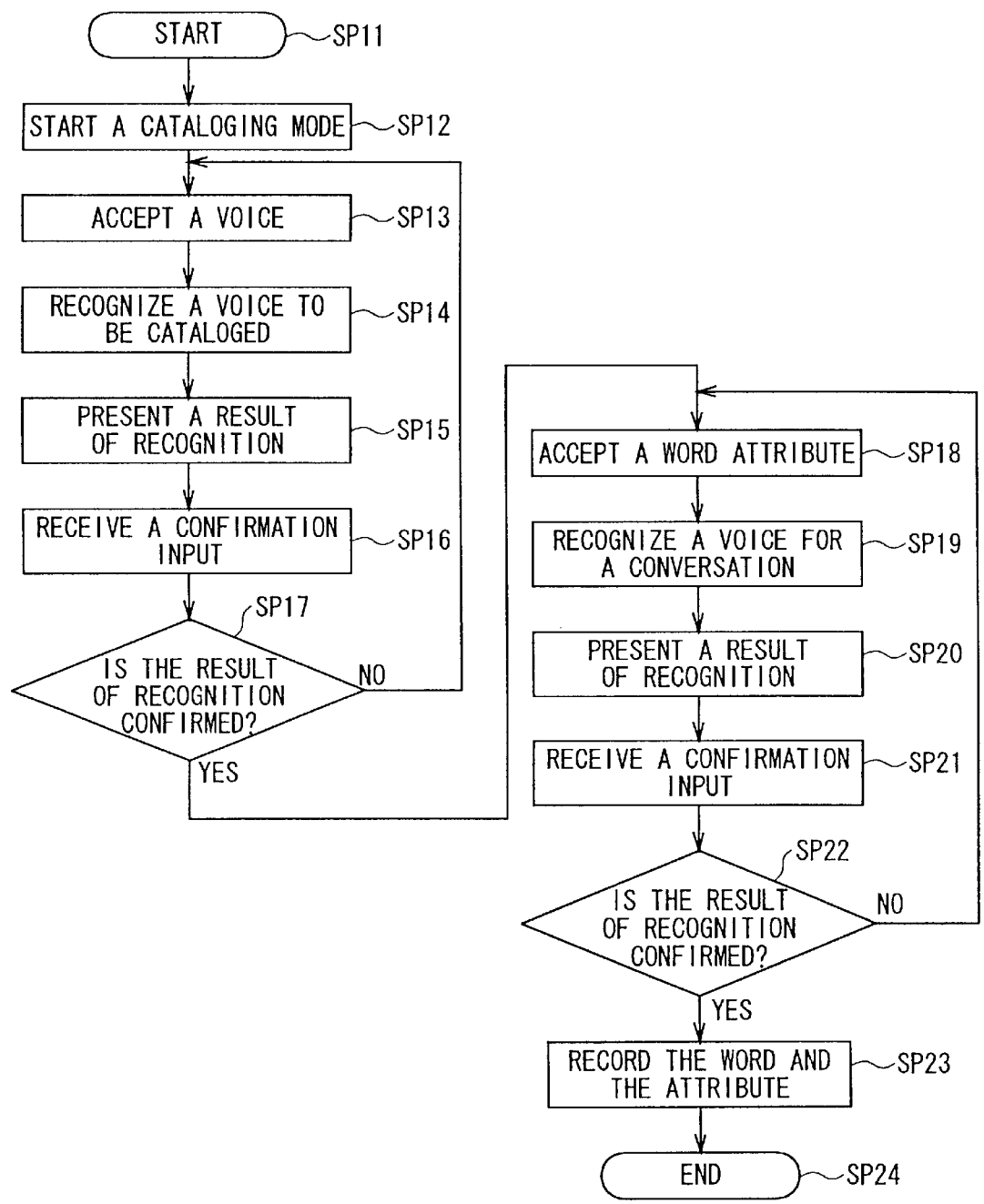
FIG. 15 shows a flowchart representing a processing procedure for cataloging recognition data.

In addition, in this embodiment, the central processing unit 11 executes a processing procedure shown in FIG. 15 when a catalog mode is selected by the user. During the execution of processing procedure, the user is requested to operate the confirm operator 4A and the cancel operator 4B as described below. The procedure is executed to catalog a word said by the user into the recognition data 16A.

As shown in FIG. 15, the procedure begins with a step SP11. When a predetermined operator is operated, the flow of the procedure goes on to a step SP12 to enter a catalog mode in which the central processing unit 11 executes the picture synthesis module 11G to display a predetermined message on the liquid-crystal display panel 3. The message requests the user to pronounce a word.

Then, the flow of the procedure proceeds to a step SP14 at which the central processing unit 11 carries out voice recognition on the voice data DA received sequentially, identifying the data DA sequentially as a series of phonemes. As the user operates a predetermined operator to end the voice input, the flow of the procedure goes on to a step SP15.

At the step SP15, the central processing unit 11 executes the voice synthesis module 11F in accordance with the series of phonemes obtained as a result of voice recognition to reproduce the voice received from the user. In this way, the result of voice recognition can be presented to the user. Assume that the user says the word "mikan". In this case, the central processing unit 11 produces a phoneme array of 'sil m i k a N sil' as a result of voice recognition and the voice synthesis module 11F generates a sound saying: "Is it a mikan?" The flow of the procedure then goes on to a step SP16 at which the central processing unit 11 accepts a signal entered by the user by operating the confirm operator 4A or the cancel operator 4B in response to the generated query sound.

The flow of the procedure then goes on to a step SP17 at which the central processing unit 11 forms a judgment as to whether the confirm operator 4A or the cancel operator 4B has been operated by the user. If the cancel operator 4B has been operated by the user, the central processing unit 11 determines that the result of voice recognition presented to the user has been denied. In this case, the flow of the procedure goes back to the step SP13 to again accept a voice input. If the confirm operator 4A has been operated by the user, on the other hand, the central processing unit 11 determines that the result of voice recognition presented to the user has been accepted. In this case, the flow of the procedure goes on to a step SP18.

At the step SP18, the central processing unit 11 again executes the picture synthesis module 11G to display a predetermined message on the liquid-crystal display panel 3. The message requests the user to say an attribute for the word said earlier as a voice input. An attribute is a keyword showing the property of an object identified by a word. An attribute is used for classifying an object. In the case of the word "mikan", for example, an attribute "fruit" is said by the user to determine the category of the word "mikan".

The flow of the procedure then goes on to a step SP19 at which the central processing unit 11 carries out voice recognition on the voice data DA received sequentially, identifying the data DA sequentially as a series of phonemes. As the user operates a predetermined operator to end the voice input, the flow of the procedure goes on to a step SP20.

At the step SP20, the central processing unit 11 executes the voice synthesis module 11F in accordance with the series of phonemes obtained as a result of voice recognition to reproduce the voice received from the user. In this way, the result of voice recognition carried out on the attribute can be presented to the user. Assume that the user says the word "fruit" as an attribute after saying the word "mikan". In this case, the voice synthesis module 11F generates a sound saying: "Is it a fruit?" The flow of the procedure then goes on to a step SP21 at which the central processing unit 11 accepts a signal entered by the user by operating the confirm operator 4A or the cancel operator 4B in response to the generated query sound.

The flow of the procedure then goes on to a step SP22 at which the central processing unit 11 forms a judgment as to whether the confirm operator 4A or the cancel operator 4B has been operated by the user. If the cancel operator 4B has been operated by the user, the central processing unit 11 determines that the result of voice recognition presented to the user has been denied. In this case, the flow of the procedure goes back to the step SP18 to again accept a voice input. If the confirm operator 4A has been operated by the user, on the other hand, the central processing unit 11 determines that the result of voice recognition presented to the user has been accepted. In this case, the flow of the procedure goes on to a step SP23.

At the step SP23, the central processing unit 11 catalogs the word 'mikan' into the recognition data 16A and the attribute 'fruit' into the knowledge base 16G. The flow of the procedure then proceeds to a step SP24 to end the whole processing.

The knowledge base 16G is recorded attributes such as the word fruit and the word drink showing classification of words and phrases cataloged in the recognition data 16A. Pattern data 16E is also recorded attributes which make the central processing unit 11 capable of asking the user for example a question: "What food do you like?" In response to this question, let the user answer: "I like mikan (oranges)." Then, in response to the answer given by the user, the central processing unit 11 for example makes a comment: "I don't like mikan (oranges)."

In addition to attributes, the knowledge base 16G also includes the name and favorites of the keeper or the owner of the electronic pet apparatus 1 as well as various kinds of data such as a weather forecast received from the network 18. If necessary, this data can be utilized in a conversation with the user. When the user asks a question: "What is today's weather forecast?", for example, the electronic pet apparatus 1 is capable of giving an answer: "A clear weather" in conformity with a predetermined rule using the words 'today' and 'weather' as key phrases.

In an operation to catalog a voice input into the recognition data 16A in the electronic pet apparatus 1 as described above, a correct text for the voice input has to be verified not to already exist in the recognition data. In the above example, the correct text is a text describing the word "mikan." Text data obtained as a result of voice recognition is an array of alphabetical marks or an array of identifiers representing a series of phonemes representing a word or a phrase entered by the user as a voice input. In the above example, the array of alphabetical marks is 'sil m i k a N sil' describing a word or a phrase to be cataloged into the recognition data 16A. If necessary, a text downloaded from the network 18 can also be cataloged into the recognition data 16A. With such a text cataloged in the recognition data 16A, a response may be generated from a recorded text in place of identifiers corresponding to a series of phonemes obtained as a result of voice recognition.

In the electronic pet apparatus 1, recognition data 16A of a word or a phrase cataloged as a result of recognition of a voice input is processed in the same way as recognition data 16A of a word or a phrase downloaded from the network 18 and recognition data 16A of a word or a phrase cataloged in advance, allowing a conversation to be held with the user.

1-4. User Authentication

Figure 16:
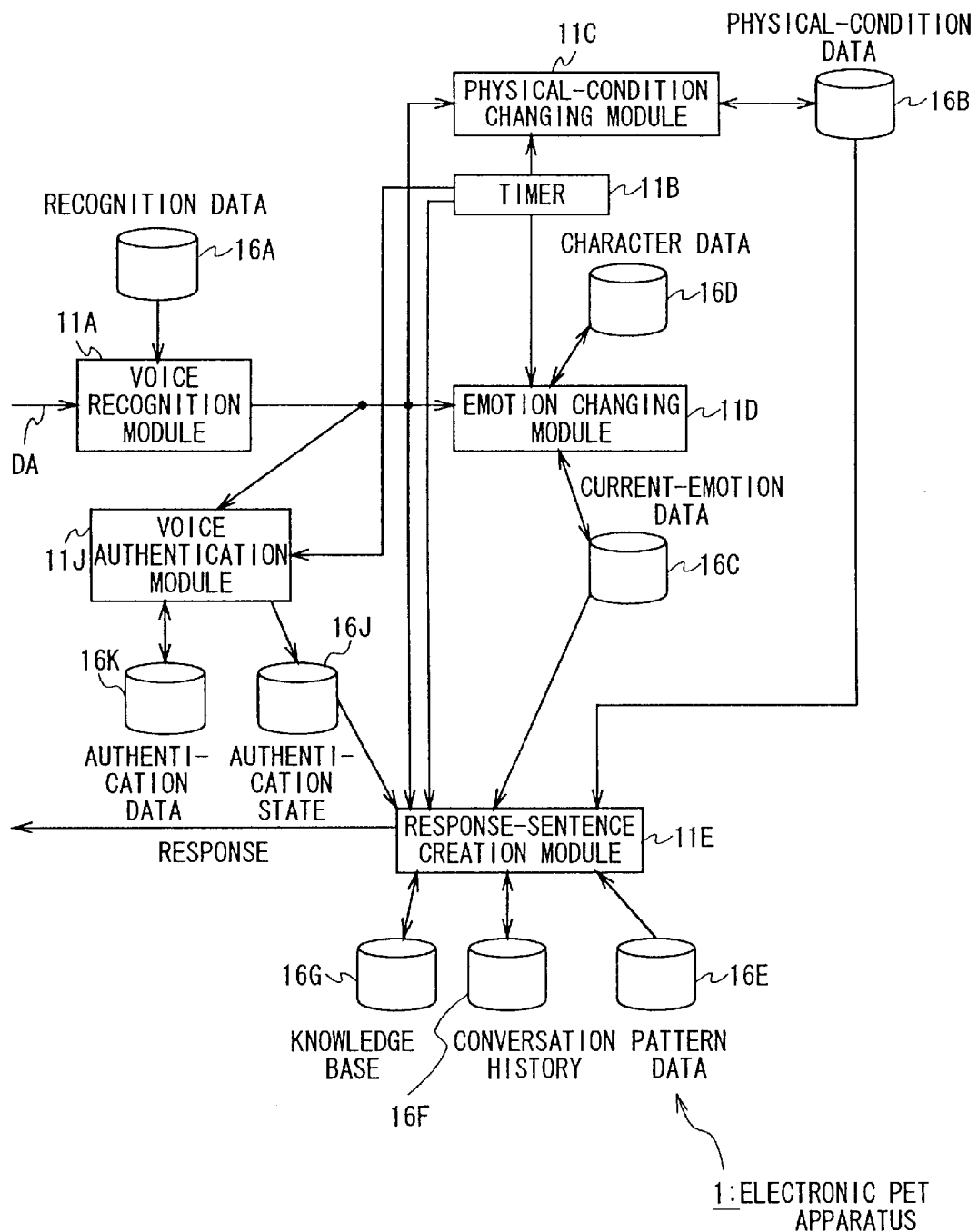
FIG. 16 is a functional block diagram showing the electronic pet apparatus in an operation to authenticate the user in more detail.

FIG. 16 is a functional block diagram showing the electronic pet apparatus 1 in an operation to authenticate the user in more detail. In this functional block diagram, authentication data 16K includes a user name recorded in advance. It should be noted that the user name is recorded as a result of voice recognition. Instead of obtaining the user name as a result of voice recognition, the user name can be entered via the keyboard of an external apparatus in initial setting processing which is typically carried out when the electronic pet apparatus 1 is purchased.

Figure 17:
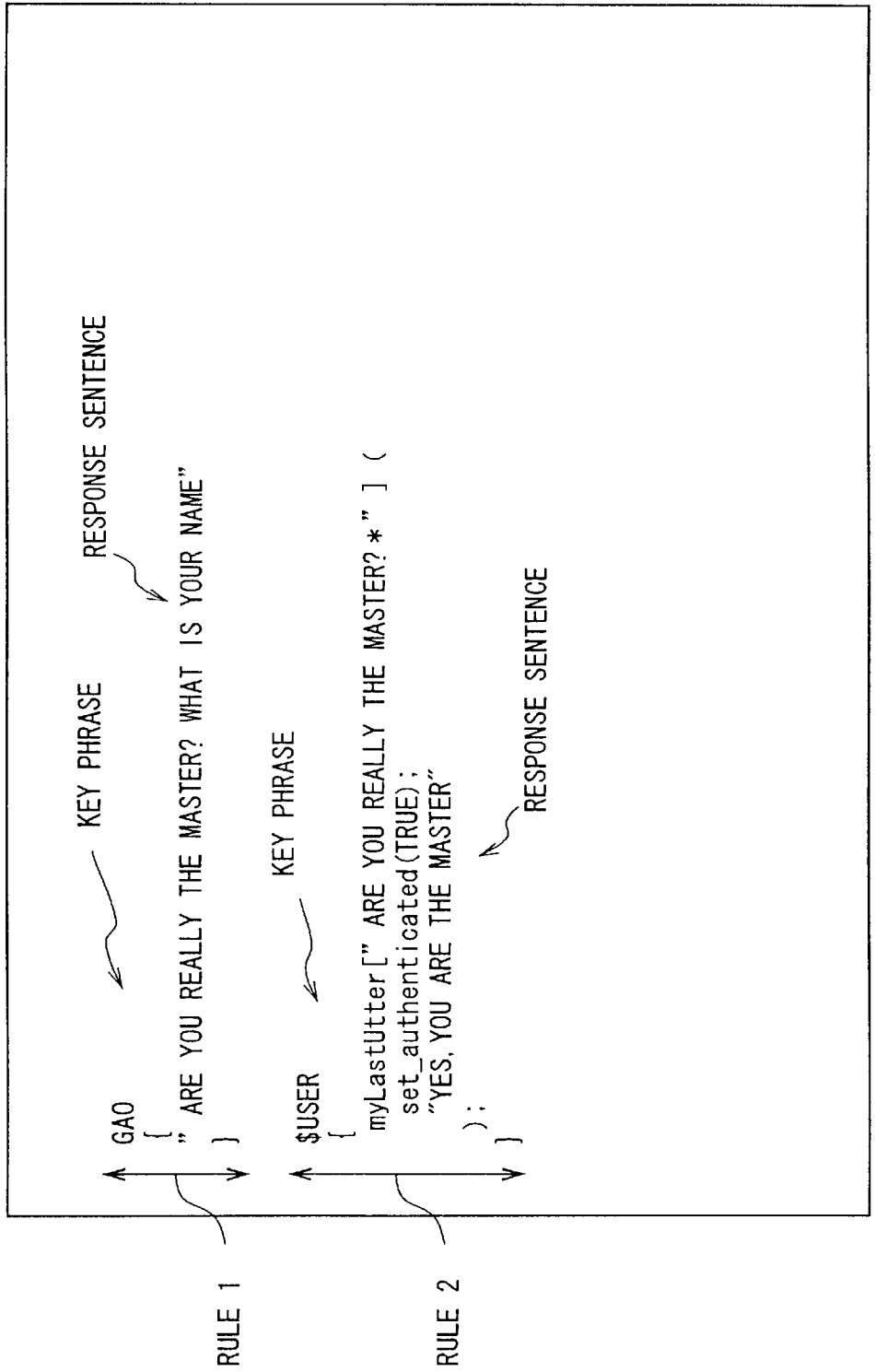
FIG. 17 shows rules of pattern data.

The response-sentence creation module 11E returns for example an answer saying: "Are you really the master?" in response to a key phrase saying: "Gao" in accordance with Rule 1 of the pattern data 16E shown in FIG. 17.

In accordance with Rule 2, a voice authentication module 11J sets a Boolean value 'authenticated' at "TRUE" (described as 'set authenticated (TRUE)' in Rule 2) if the following 2 conditions are satisfied:

a key phrase '$USER' defined as a user name and cataloged in advance is entered as a voice input; and
a response including a phrase saying: "Are you really the master?" is generated by the response-sentence creation module 11E immediately before the voice input '$USER' as myLastUtter.

It should be noted that the function set_authenticated (TRUE) cited above sets the Boolean-value 'authenticated' at TRUE.

To put it in detail, the voice recognition module 11J searches the authentication data 16K for a user name matching a result of recognition of the voice input. If such a name is found in the search, a person entering the voice input is authenticated as the user and an authenticated state 16J is set at an authenticated user state. If such a name is not found in the search, on the other hand, a person entering the voice input is not authenticated as the user and the authenticated state 16J is set at an unauthenticated user state.

If the user is authenticated, the response-sentence creation module 11E generates a response saying: "Yes, you are the master" in accordance with Rule 2.

As described above, the electronic pet apparatus 1 is capable of authenticating a user on the basis of a voice input and giving the owner a response different from a response given to a user other than the owner as shown in FIG. 8. In general, the electronic pet typically displays a behavior special for the owner as an actual pet does.

Also as described above, a user is authenticated by comparing a voice input with a word cataloged in advance.

In addition to the name of the user who has been authenticated, the voice recognition module 11J may also request the response-sentence creation module 11E to output a response making an inquiry about the favorite or the hobby of the user to be recorded in the knowledge base 16G in a conversation with the user who has been authenticated as the owner as shown in FIG. 18. In the example shown in the figure, the response making an inquiry says: "What is your favorite food, master?" This question asks the favorite food of the voice generator who has been authenticated as the owner.

In response to this query, the user says: "Peanuts" as shown in FIG. 18. The word peanuts is subjected to a voice recognition process in the voice recognition module 11J and processed in the same way as Rule 2 shown in FIG. 17 to judge by the user's voice input, a response to the inquiry about a favorite. The word "peanuts" is then cataloged in the authentication data 16K.

During a conversation with a person entering a voice input, the response-sentence creation module 11E generates an inquiry about a favorite, a hobby or the like cataloged in advance in the authentication data 16K as one shown in FIG. 19 when invoked by the timer 11B. In the case of the favorite food cataloged in the authentication data 16K as shown in FIG. 18, for example, the response-sentence creation module 11E generates an inquiry: "Are you really the master? What is your favorite food?" as shown in FIG. 19.

The voice recognition module 11J determines whether or not a voice input given by the user in response to the inquiry about the favorite food is true by carrying out the same processing as the one according to Rule 2 explained earlier by referring to FIG. 17. Since the user is the owner in this case, a voice-input response of "Peanuts" is obtained. From a result of voice recognition of this response, an authentication state is set at a Boolean value of "TRUE". In addition, the response-sentence creation module 11E generates a response of "You are really my master!"

In this way, the electronic pet apparatus 1 is capable of forming a judgment on a result of voice recognition based on a result of voice recognition obtained in the past. To put it in detail, the electronic pet apparatus 1 is capable of making an inquiry about a result of voice recognition obtained in the past in response to the user's input during a conversation with the user, and forming a judgment on a result of voice recognition of another voice input given in response to the inquiry in order to authenticate the user.

In addition, when the user does not give a voice input in response to an inquiry made by the response-sentence creation module 11E as triggered by the timer 11B even after a predetermined period of time has lapsed, the voice recognition module 11J assumes that the user has typically terminated operations of the electronic pet apparatus 1, resetting the authentication state.

1-5. Processing to Classify Conversations

Figure 20:
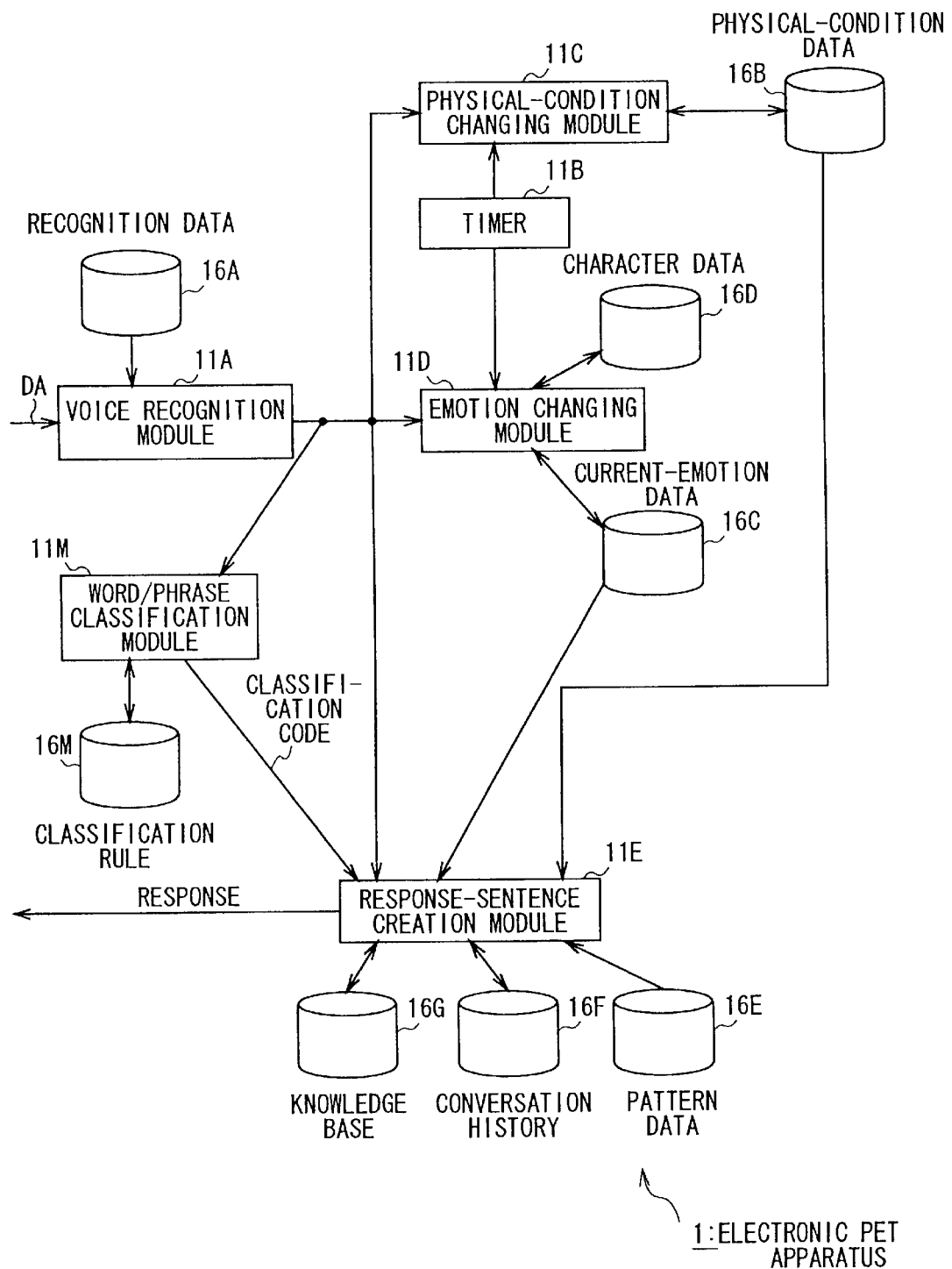
FIG. 20 is a functional block diagram showing the electronic pet apparatus in processing to classify a word or a phrase in more detail.

FIG. 20 is a functional block diagram showing the electronic pet apparatus 1 in processing to classify conversations in more detail. In this functional block diagram, a word/phrase classification module 11M identifies a result of voice recognition to classify conversations entered as a voice input in conformity with a predetermined classification rule 16M, outputting a classification code to the response-sentence creation module 11E as a result of classification.

For example, the word/phrase classification module 11M classifies voice inputs of general greetings such as "Good morning" and "Good day" into a "greeting" category. Voice inputs of inquiries such as "How are you?" and "What do you like?" are classified into an "inquiry" category. Voice inputs of impressions such as "I am fine" and "Bored" are classified into an "impression" category.

In an operation to create a response sentence according to the pattern data 16E, the response-sentence creation module 11E forms a response according to response-sentence categories recorded in the pattern data 16E and a category pattern classified by the word/phrase classification module 11M. In addition, a response is created also in accordance with past conversation records stored the conversation history 16F.

Figure 21:
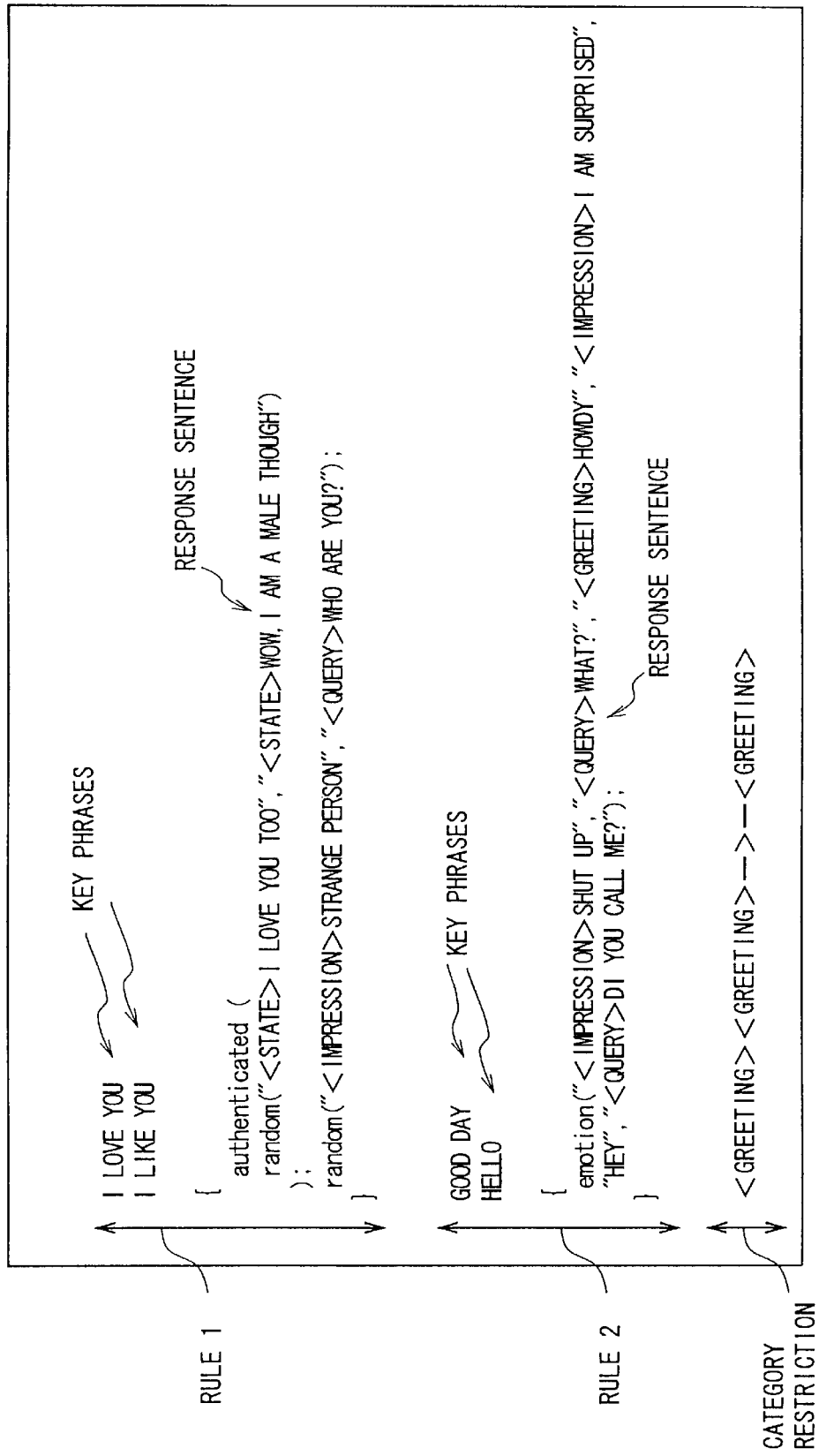
FIG. 21 shows rules of pattern data for creation of responses to a variety of categories each obtained as a result of the processing to classify a word or a phrase shown in FIG. 20.

The pattern data 16E includes rules to be followed to classify response sentences as shown in FIG. 21. The rules have the same syntax of comparison as the rules shown in FIG. 8. It should be noted that the classification rules shown in FIG. 21 are set for classification to be carried out by the word/phrase classification module 11M.

According to Rule 1 shown in FIG. 21, the phrases saying: "I love you, too" and "Wow, I am a male though" are classified into a "state" category, a phrase saying: "A strange person" is classified into the "impression" category and a phrase saying: "Who are you?" is classified into the "query" category. According to Rule 2, a phrase saying: "Shut up" is classified into the "impression" category, a phrase saying: "What?" is classified into the "query" category, a phrase saying: "Howdy" is classified into the "greeting" category and a phrase saying: "I am surprised" is classified into the "impression" category, a phrase saying: "Hi" is classified into the "greeting" category and a phrase saying: "Did you call me?" is classified into the "query" category.

In addition, the pattern data 16E also prescribes a sort of restriction that prohibits a conversation from comprising consecutive specific categories. To put it concretely, the restriction is set so that no inquiry shall be returned in response to an inquiry made by the user. Furthermore, after 2 consecutive "greetings" are exchanged between the electronic pet apparatus 1 and the user, the electronic pet apparatus 1 shall not again issue a "greeting" as stipulated in a restriction shown at the bottom of FIG. 21.

A conversation history 16F shown in FIG. 22 or 23 is made by the response-sentence creation module 11E to record a conversation between the electronic pet and the user. As shown in the figures, a history includes an action taking party generating a voice, the category of the voice and the contents of the voice. The history shown in FIG. 22 describes the user as a first-action taking party, the "greeting" category as a type of the voice generated by the first-action taking party and a phrase saying: "Good day" of the "greeting" category as contents of the voice generated by the first-action taking party. The user is followed by the electronic pet as a second-action taking party. The type of the voice generated by the second-action taking party is also the "greeting" category and the contents of the voice generated by the first-action taking party are a phrase saying: "Hi". The electronic pet is followed by the user as a third-action taking party. The type of the voice generated by the third-action taking party is the "query" category and the contents of the voice generated by the third-action taking party are a phrase saying: "How are you doing?" The user is followed by the electronic pet as a fourth action-taking party. The type of the voice generated by the fourth-action taking party is the "state" category and the contents of the voice generated by the fourth-action taking party are a phrase saying: "I am fine".

When the response-sentence creation module 11E creates a response in accordance with the pattern data 16E and on the basis of the emotion data 16C, a conversation history 16F is used as a reference and restrictions prescribed in the pattern data 16E are abided with. For example, after 2 consecutive greetings are exchanged between the electronic pet apparatus 1 and the user, the response-sentence creation module 11E shall not again issue a greeting by applying Rule 2 right after the 2 consecutive ones as stipulated in the restriction shown in FIG. 21 even if the "joy" emotion parameter has a largest value among the emotion variables. In addition, no "inquiry" shall be returned in response to an "inquiry" made by the user.

By abiding with the restriction on greetings described above, even if a first rule stipulates that a greeting shall be returned in response to a greeting and a second rule stipulates that a greeting shall be returned in response to a variety of inquiries, it is possible to avoid an unnatural conversation comprising greetings exchanged between the user and the electronic pet repeatedly a number of times due to repetitive application of the first and second rules described above.

1-6. Emotion Control

Figure 24:
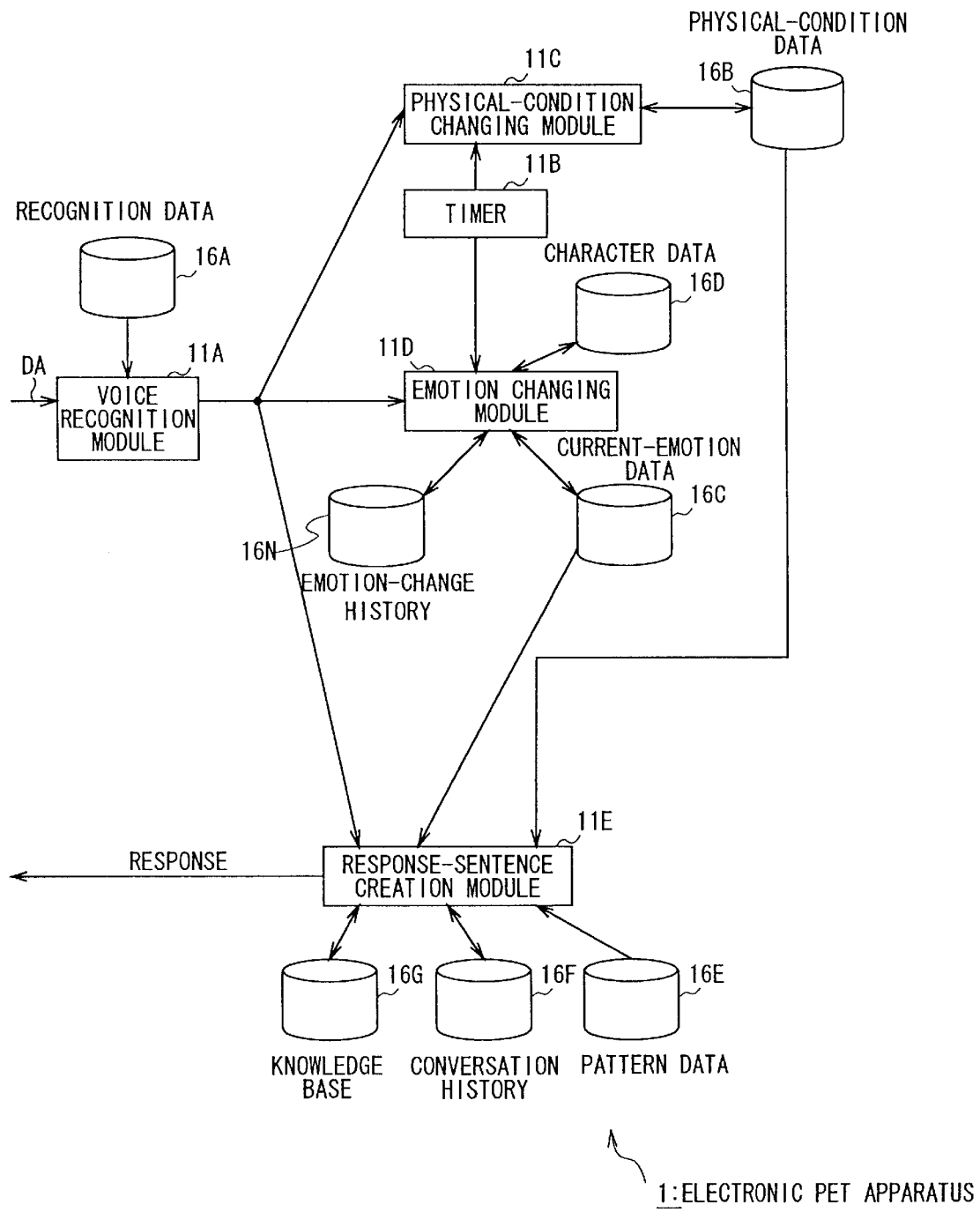
FIG. 24 is a functional block diagram showing the electronic pet apparatus in execution of emotion control in more detail.

FIG. 24 is a functional block diagram showing the electronic pet apparatus 1 in execution of emotion control in more detail. In this functional block diagram, an emotion changing module 11D is activated by the timer 11B described earlier to search the character data 16D by using a word included in a result of voice recognition as a keyword for variances corresponding to the word, and updates the emotion data 16C by using the variances found in the search.

In this processing, the emotion changing module 11D records changes in variables composing the emotion data 16C, text data obtained as a result of voice recognition of the user's input and keywords each included in the text data and used for searching the character data 16D for the changes as an emotion-change history 16N like one shown in FIG. 25. In addition, with predetermined timing typically after a response has been output, the emotion-change history 16N is searched for a word used frequently in user inputs in conjunction with a keyword. If such a word is found, the word is cataloged in the character data 16D as a new keyword as shown in FIG. 26. The character data 16D shown in FIG. 26 is obtained by cataloging a new keyword in the character data 16D shown in FIG. 6. By cataloging this word in the character data 16D as a new keyword, the variables of the emotion data 16C can be updated even when this word alone is input in the same way as the other keywords.

For example, assume the phrase "curry bread" is used in user inputs as shown in FIG. 25 in conjunction with the keyword "dirty" which changes the variables of the emotion data 16C a number of times exceeding a predetermined value. In this case, the emotion changing module 11D catalogs the phrase "curry bread" in the character data 16D as a new keyword as shown in FIG. 26. As shown in FIG. 26, the variables of the emotion data 16C are updated by using the same changes as the keyword "dirty" even when this phrase "curry bread" only is input.

As a result, the electronic pet apparatus 1 sets a variety of parameters and variables so that a specific emotion is resulted in by the so-called associative information and is hence capable of generating a response based on the resulting emotion.

In addition, when the emotion changing module 11D searches the emotion-change history 16N with the predetermined timing as described above, the frequency of using each keyword for changing the variables of the emotion data 16C is also found out as well. If the frequency of using a keyword is found greater than a predetermined value, as shown in FIG. 27, the emotion changing module 11D reduces the absolute values of the variations in the character data 16D for the keyword from the original values shown in FIG. 6. In the emotion-change history 16N shown in FIG. 27, for example, the keyword "dirty" is used frequently. Thus, the variations in 6 variables, namely, the "anger", "sadness", "joy", "fear", "surprise" and "hatred" emotion parameters in the character data 16D for the keyword "dirty" are changed by −1, −1, +2, +1, −1 and −4 respectively.

In this way, the electronic pet apparatus 1 is capable of forming the so-called sense of accustoming.

If the frequency of using a keyword of the character data 16D in voice inputs gets lower, on the other hand, the emotion changing module 11D eliminates the keyword used in voice inputs from the character data 16D. As described above, if the frequency of using a keyword is found greater than a predetermined value, the emotion changing module 11D reduces the absolute values of the variations in the character data 16D for the keyword. If the frequency of using the keyword decreases again, however, the variations are gradually restored to their original values.

In this way, the electronic pet apparatus 1 is capable of creating the so-called state of forgetting something.

1-7. Operation of the First Embodiment

In the configuration described above, the voice recognition module 11A employed in the electronic pet apparatus 1 shown in FIGS. 1 to 3 carries out a voice recognition process using the HMM method on a voice input entered by the user via the microphone 7. As described above, the voice recognition module 11A is a functional block, the processing of which is carried out by the central processing unit 11. In the voice recognition processing, a voice is first converted into a series of phonemes which are then transformed into text data by referring to the recognition data 16A.

In the electronic pet apparatus 1, text data obtained as a result of voice recognition carried out in this way is supplied to the physical-condition changing module 11C which changes the 5 elements of the present physical condition, namely, the "fatigue", "hunger", "thirstiness", "sickness" and "sleepiness" parameters of the physical-condition data 16B shown in FIG. 4, in accordance with a word included in a voice input. When food has been given as indicated by a result of a voice recognition, for example, the "hunger" parameter is decreased and, when a drink is received as indicated by a result of a voice recognition, for example, the "thirstiness" parameter is decreased.

In this way, the electronic pet apparatus 1 is capable of changing the physical condition by a voice input entered by the user. In addition, the 5 parameters can also be changed gradually by processing carried out by the physical-condition changing module 11C and based on the timer 11B. Thus, in the electronic pet apparatus 1, the physical condition expressed in terms of these parameters is modified by a voice input entered by the user and changes with the lapse of time. As a result, by generating a response based on the 5 parameters to a voice input, the physical condition of the electronic pet is reflected in the response to the voice input.

In addition, the result of voice recognition is supplied also to the information changing module 11D which changes the emotion data 16C shown in FIG. 5 in accordance with a word included in a result of voice recognition. Changes in emotion data 16C are described in character data 16D. The 6 variables expressing the emotion are updated in accordance with keywords and the character data 16D. To put it in detail, keywords are the words for changing emotions of the electronic pet, while, as shown in FIG. 6, the character data 16D comprises variations in 6 variables expressing the emotion, namely, the "anger", "sadness", "joy", "fear", "surprise" and "hatred" parameters, for a variety of keywords, that is, words included in voice inputs. That is to say, the emotion is changed in accordance with a voice input entered by the user.

In this way, the electronic pet apparatus 1 changes the emotion of the electronic pet in accordance with a voice input given by the user. In addition, since the electronic pet apparatus 1 creates a response to a voice input in accordance with a result of recognition of the voice input on the basis of the physical-condition data 16B and the emotion data 16C, the response of the electronic pet reflects the physical condition and the emotion of the electronic pet.

To put it in detail, in the electronic pet apparatus 1, a result of voice recognition is supplied to the response-sentence creation module 11E which creates a response sentence for the result of voice recognition in accordance with rules described in the pattern data 16E as shown in FIG. 8. To put it in detail, in the electronic pet apparatus 1, the pattern data 16E describes a response sentence for each key phrase included in the voice input. The response-sentence creation module 11E searches the pattern data 16E for a response sentence associated with the key phrase obtained as a result of voice recognition, outputting the response sentence as a search result.

In the electronic pet apparatus 1, a actual response corresponding to the response sentence is generated by the voice synthesis module 11F and output to the speaker 6.

Files each containing the voice for each response are shown in FIG. 9. On the other hand, a picture associated with the actual response is created by the picture synthesis module 11G to be displayed on the liquid-crystal display panel 3. Files each containing the picture for each response are shown in FIG. 10. In this way, a actual response to a voice input entered by the user is presented to the user as a voice and a picture.

Since a response is created in the electronic pet apparatus 1 from the pattern data 16E comprising rules for generating different responses in accordance with the physical-condition data 16B and the emotion data 16C, the response to the user reflects the physical condition and the emotion of the electronic pet.

In the processing sequence described above, the electronic pet apparatus 1 is capable of switching the operation to a cataloging operation mode in conformity with a predetermined operator carried out by the user. In this mode, a word and a phrase that can be recognized in a voice recognition process are cataloged into the recognition data 16A.

To put it in detail, when a voice representing a word or the like to be cataloged is received as an input from the user in this cataloging mode, the electronic pet apparatus 1 carries out the same processing as that in the normal operating mode shown in FIGS. 13 to 15 to convert the voice input into a series of phonemes in accordance with the syntax shown in FIG. 14. A voice represented by this series of phonemes is then generated by the voice synthesis module 11F to be confirmed by the user. After the user confirms that the result of voice recognition is correct, the user enters another voice input representing the attribute of the confirmed word or the like.

The electronic pet apparatus 1 also converts the voice input representing the attribute into a series of phonemes. If a voice generated from this series of phonemes is also confirmed by the user, the series of phonemes representing the word or the like entered earlier is cataloged into the recognition data 16A while the data of the attribute is cataloged into the knowledge base 16G, being associated with the word or the like cataloged in the recognition data 16A.

As described above, the electronic pet apparatus 1 is capable of cataloging words and the like entered as a voice input without carrying out difficult operations on an input unit such as a keyboard, allowing the degree of freedom to use the apparatus 1 to be raised commensurately. In addition, it is possible to make the word vocabulary larger to nurture the electronic pet as if the user were actually training a real pet. As a result, the electronic pet can be made familiar and easy to get acquainted with commensurately.

As described above, in a normal voice recognition process, the recognition data 16A is searched for text data corresponding to a series of phonemes obtained as a result of voice conversion and the text data is output as a result of voice recognition used in creation of a response sentence. The text data found in the search may be a word or the like cataloged in the cataloging mode described above. Such text data described by a series of phonemes can also be used in creation of a response sentence in place of text data usually found in the normal voice recognition process. Creation of a response sentence is also based on an attribute recorded in the knowledge base 16G. Thus, when the physical-condition data 16B indicates that the electronic pet is hungry and the input received from the user has a food attribute, for example, the electronic pet apparatus 1 is capable of generating a response stating typically: "I want to eat" or "I want some food."

As described above, a word and the attribute of the word are received as separate voice inputs and, after the results of voice recognition of the voice inputs are confirmed by the user, the word and the attribute are cataloged. In this way, since a word and the attribute of the word are entered by the user separately as voice inputs and their results of voice recognition are confirmed by the user, it is possible to catalog the word and the attribute with ease and a high degree of reliability.

When the user enters a voice input saying: "Gao", on the other hand, the electronic pet apparatus 1 carries out the processing represented by the functional block diagram shown in FIG. 16, using the input voice as a keyword for generating a voice based on Rule 1 shown in FIG. 17 in order to request the user to enter information cataloged in advance such as the name of the user. A voice input entered by the user in response to this request is subjected to a voice recognition process. The voice recognition module 11J employed in the electronic pet apparatus 1 compares a result of the voice recognition process with the recognition data 16K. If the outcome of the comparison authenticates the user, the authentication state 16J is set to indicate that the person entering the voice is the owner.

The response-sentence creation module 11E of the electronic pet apparatus 1 creates a response sentence based on a rule of the pattern data 16E or Rule 1 of FIG. 8 which distinguishes a person other than the owner entering a voice input from the owner. To be more specific, the response-sentence creation module 11E refers to the authentication state 16J and creates different responses depending on the value of the authentication state 16J.

Thus, the electronic pet apparatus 1 is capable of responding by displaying a special behavior to the owner as a real pet does, allowing the electronic pet to be made easy to get acquainted with commensurately.

In addition, in the electronic pet apparatus 1, the timer 11B activates the voice authentication module 11J to carry out processing of user authentication at predetermined intervals. In the user authentication processing which is carried out at predetermined intervals, the voice authentication module 11J forms a judgment as to whether or not the user is the owner. As shown by a typical conversation of FIG. 19, the judgment is based on a voice input entered by the user in response to an inquiry about the favorite, the hobby or the like of the user which was recorded in the knowledge base 16G as shown by a typical conversation of FIG. 18. In this way, processing to authenticate the user can be carried out.

Thus, the electronic pet apparatus 1 is capable of creating a response showing a special behavior to the owner by verifying the conversation partner to be the user in the course of conversation when necessary.

In the course of a conversation, the word/phrase classification module 11M employed in the electronic pet apparatus 1 classifies a voice input into a "greeting" or "query" category or the like in processing shown in FIG. 20 in accordance with the word/phrase classification rule 16M by referring to a conversation history like one shown in FIG. 22 or 23 if necessary. In addition, a response to a voice input said by the user is created by following a category restriction described in the pattern data 16E shown in FIG. 21. If a voice input said by the user is classified into the "query" category, for example, the classification restriction does not allow a response to be generated even if a key phrase corresponding to the voice input in a rule stipulates that a query be generated as a response to the voice input.

Thus, the electronic pet apparatus 1 is capable of avoiding an unnatural conversation in which a query is returned in response to a query raised by the user.

In addition, the electronic pet apparatus 1 records categories of consecutive words or phrases in a continuous-conversation history 16F. A response to a voice input said by the user is created by referring to categories recorded in the continuous-conversation history 16F and by considering a category restriction described in the pattern data 16E shown in FIG. 21. As a result, when the user enters a greeting following a greeting said by the electronic pet apparatus 1, the electronic pet apparatus 1 does not generate another greeting in response to the user's greeting in accordance with the category restriction even if a greeting-to-greeting rule stipulates that a greeting shall be generated in response to a greeting.

Thus, the electronic pet apparatus 1 is capable of avoiding an unnatural conversation in which greetings are exchanged a number of times forever, allowing the electronic pet to be made a familiar thing.

In addition, the electronic pet apparatus 1 also carries out processing shown in the functional block diagram of FIG. 24 to record changes in variables composing the emotion data 16C, text data obtained as a result of voice recognition of the user's input and keywords each included in the text data in the emotion-change history 16N like the one shown in FIG. 25. In the electronic pet apparatus 1, the emotion-change history 16N is searched for a word used frequently in user inputs in conjunction with a keyword at predetermined intervals. If such a word is found, the word is cataloged in the character data 16D as a new keyword used for changing the emotion data 16C as shown in FIG. 26.

For example, assume that, in the electronic pet apparatus 1, the phrase "curry bread" is used in user inputs as shown in FIG. 25 in conjunction with the keyword "dirty" which changes the variables of the emotion data 16C a number of times exceeding a predetermined value. In this case, the emotion changing module 11D catalogs the phrase "curry bread" in the character data 16D as a new keyword as shown in FIG. 26. As shown in FIG. 26, the variables of the emotion data 16C are updated and a response is generated even when this phrase "curry word" alone is input by using the same changes as the keyword "dirty".

Thus, the electronic pet apparatus 1 is capable of changing the emotion of the electronic pet by a variety of variations as an animal reacts in dependence on conditions and as a human being changes the emotion thereof as a result of an association process. In addition, the electronic pet apparatus 1 is capable of reflecting the variations in emotion in a response generated thereby.

In addition, when the emotion changing module 11D employed in the electronic pet apparatus 1 searches the emotion-change history 16N, the frequency of using each keyword for changing the variables of the emotion data 16C is also checked out as well. If the frequency of using a keyword is found greater than a predetermined value, as shown in FIG. 27, the emotion changing module 11D reduces the absolute values of the variations in the character data 16D for the keyword. In this way, the electronic pet apparatus 1 is capable of forming the so-called sense of accustoming and the state of accustoming is reflected to the response.

In the electronic pet apparatus 1 used in this way, the user is allowed to operate the operators on the front panel shown in FIG. 2 to connect the apparatus 1 to the network 18 through the network connection unit 17 shown in FIG. 1. With the network connection unit 17 connected to the network 18, the electronic pet apparatus 1 is capable of downloading information such as recognition data 16A, knowledge base data 16G and pattern data 16E from the network 18. As described earlier, the downloaded information is effective rules necessary for the voice recognition processing and the response generation processing. The downloaded information is also used to update the recognition data 16A and the knowledge base 16G, allowing the user to enjoy conversations with the electronic pet at a higher level. In addition, it is also possible to download voice data 16H and picture data 16I which can be used as actual response outputs. In this way, expressions of responses can also be improved as well.

By the same token, it is also possible to transmit the physical-condition data 16B, the emotion data 16C and the a conversation history 16F to a desired apparatus by way of the network 18. In this way, the recipient apparatus is capable of reproducing the electronic pet of the electronic pet apparatus 1, allowing the electronic pet to be taken out to a variety of environments.

On the contrary, it is also possible to receive physical-condition data 16B, emotion data 16C and a conversation history 16F from the network 18, allowing the electronic pet apparatus 1 to generate a response as if another electronic pet were visiting the electronic pet apparatus 1 or as if an electronic pet raised in another electronic pet apparatus had been brought out to this electronic pet apparatus 1.

1-8. Effects of the First Embodiment

According to the configuration described above, the recognition data used as rules of voice recognition, the pattern data used as rules of response generation, the emotion data used as rule of emotion generation, the physical-condition data, the voice data and the picture data can be updated through the network, making it possible to generate almost the same responses as responses generated by the another apparatus of the same type connected to the network as if an electronic pet had been brought out from the other apparatus to this electronic pet apparatus. In addition, the electronic pet apparatus also makes the electronic pet easy to get acquainted with as a real pet in actual training is. Moreover, the amount of knowledge can also be increased by typically increasing the number of words that can be understood by the electronic pet if necessary.

Furthermore, the recognition data can be updated by periodical connection to the network. Thus, the amount of knowledge can be increased without the need for the user to take the trouble to do it.

On the contrary, the physical-condition data, the emotion data and a conversation history can be transmitted to another apparatus of the same type by way of the network. In this way, the other apparatus is capable of generating almost the same responses as responses to voice inputs entered to this information processing apparatus such as the electronic pet apparatus, allowing the electronic pet to be treated as if the electronic pet had been taken out to the other apparatus. As a result, the electronic pet apparatus is capable of making the electronic pet easy to get acquainted with as a real pet in actual training is.

In addition, data can be updated and transmitted by using an IC card which is replaceable recording media. To be more specific, a new IC card is mounted to update data and an IC card is taken to another apparatus to transfer data to the other apparatus. Thus, data can also be exchanged with various kinds of equipment with no communication function.

Moreover, in a cataloging operation mode, a result of voice recognition of a word and the category of the word are cataloged, allowing size of the vocabulary of words which can be understood by the electronic pet to be increased with ease by voice inputs. As a result, the electronic pet can be treated in the same way as a real pet is raised in actual training and can be made easy to get acquainted with.

Furthermore, at that time, on the basis of series of phonemes obtained as a result of voice recognition, the result of voice recognition of the word and the category of the word are cataloged. Thus, a word and its category can be cataloged by merely entering a voice input without carrying out other operations.

On the top of that, a result of voice recognition is output as text data in normal processing and, in a cataloging operation, a description of a series of phonemes is recorded. As a result, description of data such as rules can be simplified.

In addition, a word and an attribute are treated as inputs distinguished from each other in the cataloging operation. As a result, the cataloging process can be executed with ease.

Furthermore, a result of user authentication based on a voice input is used as a basis for generating different responses for different persons entering voice inputs. Thus, a response of the electronic pet for the owner can be made different from a response for a person other than the owner. As a result, the electronic pet is capable of displaying a behavior as a real pet does and becomes more familiar as well as easier to get acquainted with.

Moreover, by using results of voice recognition obtained in the past, a result of voice recognition obtained this time is examined to authenticate the user. In this way, the user can be authenticated by a conversation without entering a password. As a result, the degree of freedom to use the electronic pet apparatus can be raised.

On the top of that, by using results of voice recognition obtained in the past, the user's response to an inquiry obtained this time is examined to authenticate the user or the user is authenticated by user's saying of a predetermined word. In this way, the user can be authenticated through a natural conversation. As a result, the degree of freedom to use the electronic pet apparatus can be raised commensurately.

In addition, by identifying the type of a voice input and by generating a response other than a response of a predetermined type or generating a response of a category corresponding to the identified type of the voice input, it is possible to avoid an unnatural conversation like one in which an inquiry is made in response to an inquiry. In this way, a response given by the electronic pet can be made natural as well as lively. As a result, the electronic pet can be made more familiar and easier to get acquainted with.

Furthermore, at that time, generation of a response by referring to a history including the types of input and responses can avoid an unnatural conversation like one in which greetings are exchanged repeatedly a number of times. In this way, a response given by the electronic pet can be made natural as well as lively. As a result, the electronic pet can be made more familiar and easier to get acquainted with.

Moreover, variations in emotion parameters can be changed in accordance with a history of result of the voice recognition and corresponding emotion parameters. For a voice heard frequently, for example, it is possible to generate a response full of emotions of intimacy, familiarity and the like. In this way, a response given by the electronic pet can be made natural as well as lively. As a result, the electronic pet can be made more familiar and easier to get acquainted with.

To be more specific, if a word other than a specific word exciting an emotion is used at the same times as the specific word or as frequently as the specific word is, this frequently used word also changes the emotion parameters. That is to say, it is possible to generate a response based on an emotion changed by a repeatedly used word in combination with the specific word.

On the top of that, if a specific word among words exciting an emotion is used frequently, variations in emotion parameters are decreased. As a result, the so-called sense of accustoming can be formed.

2. Effects of Other Embodiments

In the embodiment described above, the electronic pet apparatus can be connected to a network to take out the electronic pet from the electronic pet apparatus, to generate a response of an electronic pet raised in another apparatus and to teach the electronic pet nurtured in this electronic apparatus a variety of rules and various kinds of information. It should be noted, however, that the scope of the present invention is not limited to this embodiment. For example, only some of the processing described above can be made to be carried out when necessary. In addition, the electronic pet apparatus makes an access to the network periodically when the user carries out a predetermined operation or when a call is received from another apparatus.

Moreover, according to the embodiment described above, the electronic pet apparatus is connected to a network by a telephone line. It is worth noting, however, that the invention can also be applied to applications wherein the electronic pet apparatus is connected to a network through other equipment such as a modem or a personal computer.

Furthermore, in the embodiment described above, the so-called electronic pet learns recognition data, pattern data, voice data and picture data downloaded from a network. It should be noted, however, that the scope of the present invention is not limited to this embodiment. For example, the electronic pets may also learn only some of the downloaded data as necessary. In addition, the technique itself to recognize a voice, the technique to generate voice data and the technique to generate picture data themselves can be modified by downloaded control programs describing the techniques. By the same token, the technique to generate emotion data and the processing of the response-sentence creation module and other processing can also be changed.

On the top of that, according to the embodiment described above, physical-condition data, emotion data and a conversation history can be transmitted to another apparatus in order to take out the electronic pet thereto. It is worth noting, however, that the scope of the present invention is not limited to such an embodiment. For example, when only some of the data is transmitted or the data is transmitted along with information such as knowledge, other apparatus may carry out processing to emulate the electronic pet of this electronic pet apparatus. In addition, instead of transmitting such data, a response to an input obtained as a result of voice recognition carried out by another apparatus can be transmitted to the other apparatus.

Furthermore, according to the embodiment described above, various kinds of data can be input from another apparatus in order to bring out the electronic pet of the other apparatus to this electronic pet apparatus. It should be noted, however, that the scope of the present invention is not limited to such an embodiment. For example, when only some of the data is received or the data received along with information such as knowledge, processing to emulate the electronic pet of the other apparatus can be carried out. In addition, instead of internally processing such data received from the other equipment, this electronic pet apparatus may transmit a result of voice recognition to the other apparatus and then receives a response to the result of voice generation from the other apparatus.

Moreover, in the embodiment described above, a voice input is subjected to a voice recognition process to convert the input into a series of phonemes. It is worth noting, however, that the scope of the present invention is not limited to such an embodiment. For example, a variety of voice recognition techniques proper for processing requirements can also be adopted.

On the top of that, in the embodiment described above, a word and the attribute of the word are each entered as a voice input to be cataloged in the electronic pet apparatus. It should be noted, however, that the scope of the present invention is not limited to such an embodiment. For example, an attribute can be selected and entered to the electronic pet apparatus by the user by operating an operator. In this case, there is a conceivable technique whereby the user is requested to enter an attribute by selecting an item on a displayed menu.

Furthermore, according to the embodiment described above, for a voice input to be cataloged in an authentication data as text data of a series of phonemes representing the voice input, a result of voice recognition is output as a series of phonemes. As for an ordinary result of voice recognition, ordinary text data is merely produced. It is worth noting, however, that the scope of the present invention is not limited to such an embodiment. For example, also for an ordinary result of voice recognition, the result of voice recognition can be output as a series of phonemes.

Moreover, in the embodiment described above, the user is authenticated by identifying the name or the favorite of the user. It should be noted, however, that the scope of the present invention is not limited to such an embodiment. For example, the present invention can also be applied to a wide range of applications wherein the user is authenticated by verifying a password, a date of a past conversation or a past result of voice recognition.

On the top of that, in the embodiment described above, the user is authenticated by checking a special phrase said by the user in response to a predetermined query made by the electronic pet apparatus and the user is authenticated periodically. It is worth noting, however, that the scope of the present invention is not limited to such an embodiment. For example, the user can also be authenticated either by verification of a special phrase or periodically as necessary.

Furthermore, according to the embodiment described above, in a process to recognize a voice input by splitting the input into a series of phonemes, the user is authenticated by verifying a generated voice representing a special word. It should be noted, however, that the scope of the present invention is not limited to such an embodiment. For example, the user can also be authenticated by verifying a variety of characteristic quantities representing the characteristics of the user's voice to give the same effect as the embodiment described above. Examples of the characteristics quantities are the tone and the frequency spectrum of the voice.

Moreover, in the embodiment described above, a response of the electronic pet for the owner can be made different from a response for a person other than the owner. It is worth noting, however, that the scope of the present invention is not limited to such an embodiment. For example, more different responses can be generated for more different persons providing voice inputs such as members of the family of the owner and persons other than family members.

On the top of that, in the embodiment described above, an inquiry is prevented from being issued in response to an inquiry in a simple manner based on the type of the inquiry input and the type of the inquiry response. It should be noted, however, that the scope of the present invention is not limited to such an embodiment. For example, an inquiry may be issued in response to an inquiry due to reasons such as the emotion. In this case, it shows that the electronic pet is in the bad mood.

Furthermore, according to the embodiment described above, the emotion is controlled by manipulation of character data. It is worth noting, however, that the scope of the present invention is not limited to such an embodiment. For example, the emotion data can also be changed directly instead of manipulating the character data.

Moreover, the embodiment described above outputs voice data and picture data. It should be noted, however, that the scope of the present invention is not limited to such an embodiment. For example, voices and pictures are output as a result of audio and video syntheses.

Figure 28:
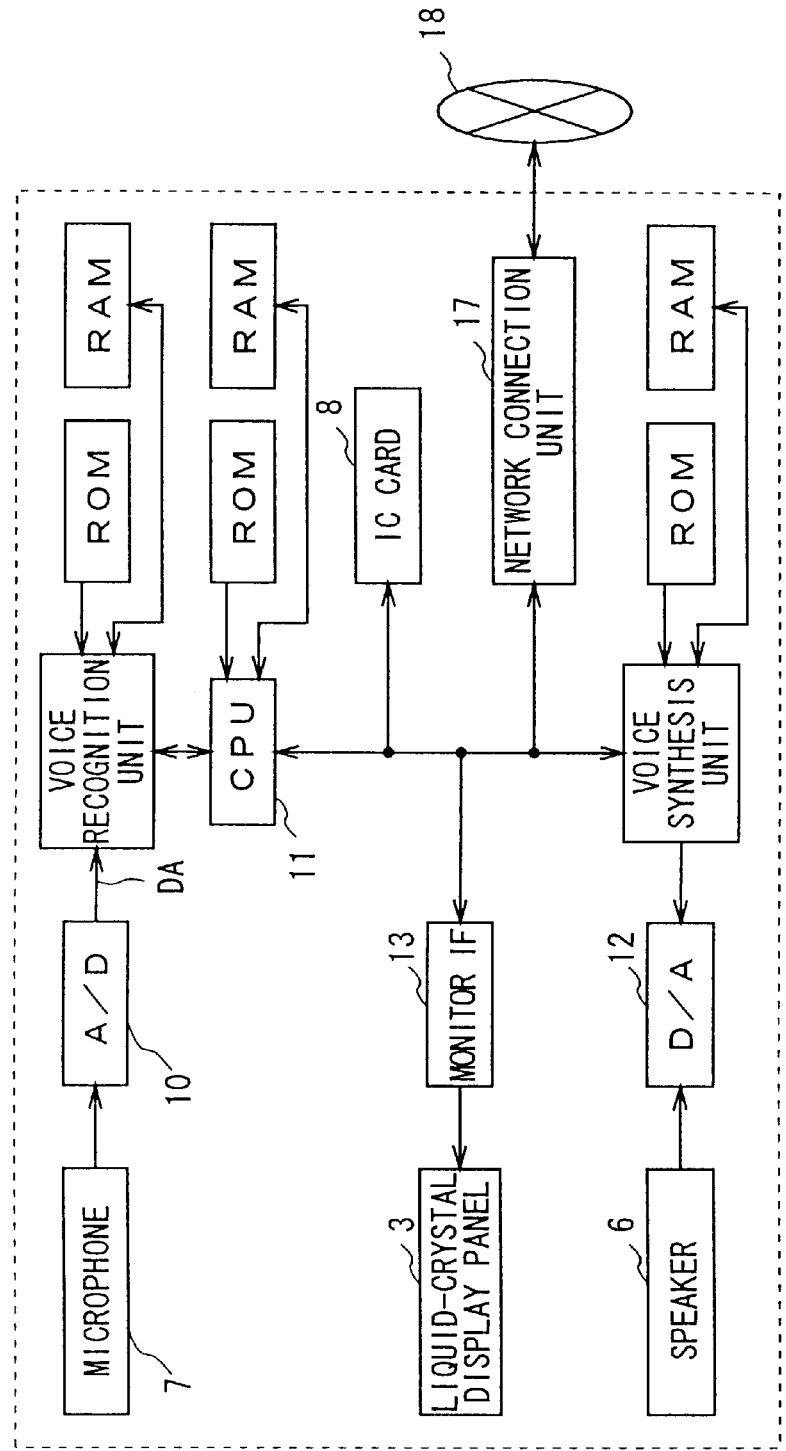
FIG. 28 is a hardware block diagram showing an electronic pet apparatus as implemented by another embodiment of the present invention.
Figure 29:
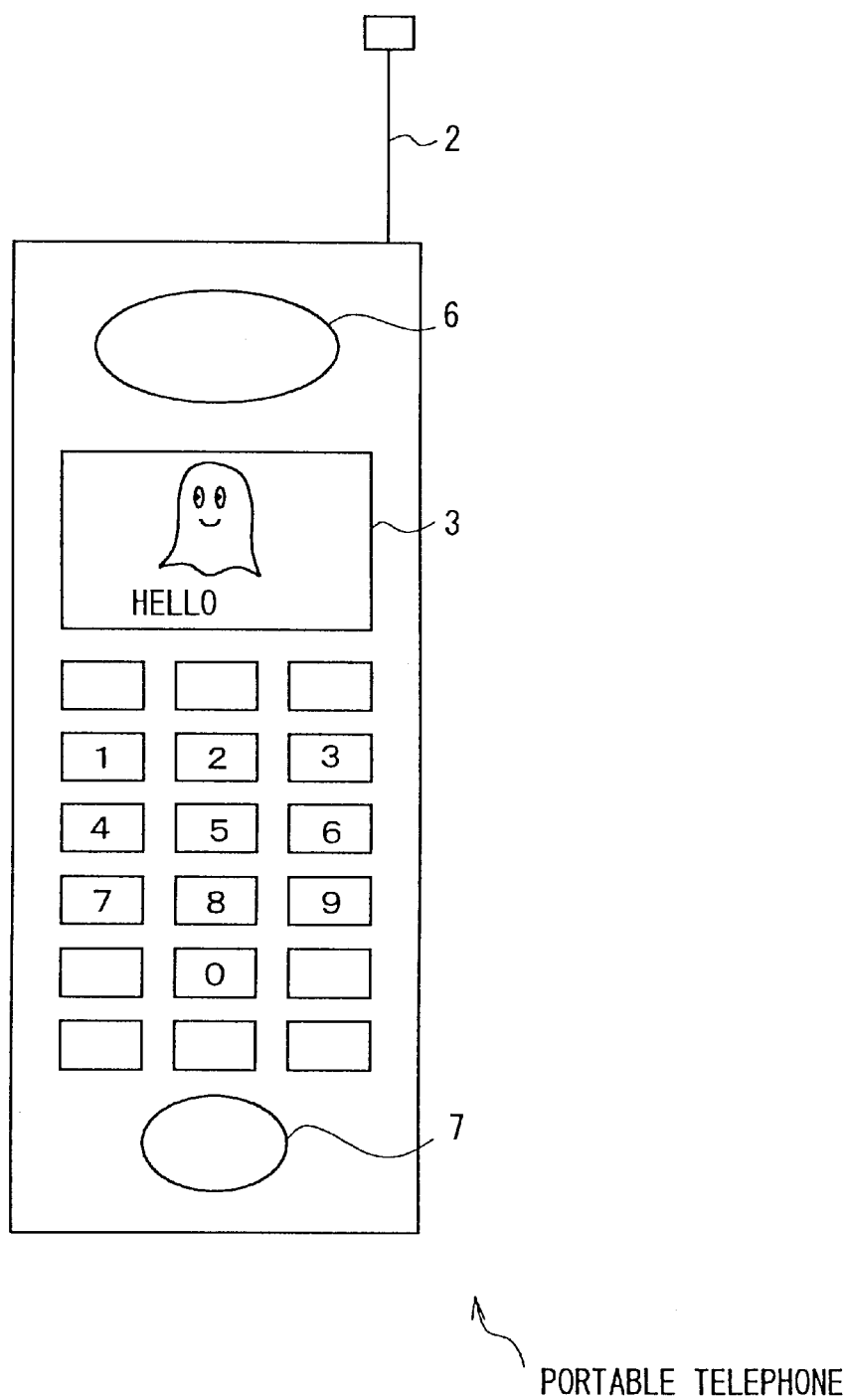
FIG. 29 is a diagram showing a front view of a portable telephone.

On the top of that, in the embodiment described above, the voice recognition processing and the picture synthesis processing are carried out by the central processing unit as shown in FIG. 3. It is worth noting, however, that the scope of the present invention is not limited to such an embodiment. For example, the voice recognition processing and the picture synthesis processing can also be carried out by dedicated circuits as shown in FIG. 28.

Furthermore, the embodiment described above applies the present invention to an electronic pet apparatus outputting a voice and a picture as a response. It should be noted, however, that the scope of the present invention is not limited to such an embodiment. For example, the present invention can also be applied for example to a robot moving like an animal, an electronic pet apparatus moving and crying to output a response and an electronic pet apparatus outputting responses in a variety of forms.

Moreover, the embodiment described above applies the present invention to an electronic pet apparatus which is a special-purpose apparatus for emulating an electronic pet with the front panel thereof shown in FIG. 2. It is worth noting, however, that the scope of the present invention is not limited to such an embodiment. For example, the present invention can also be applied to a variety of portable devices such as a portable telephone, a portable GPS, a portable tape recorder and a portable optical-disc drive with a front panel thereof shown in FIG. 28. In addition to such portable devices, the present invention can also be applied to information processing apparatuses such as a personal computer in which a variety of animation characters or the like move.

Industrial Applicability

The present invention can be utilized for an entertainment robot.

What is claimed is:

1. An electronic pet apparatus characterized in that said apparatus comprises:

voice input means for inputting a voice output by the user;

voice recognition means for recognizing a voice received from said voice input means and for outputting a result of voice recognition in conformity with a predetermined recognition rule;

emotion generation means for generating an emotion parameter, which indicates an emotion in a pseudo manner as well as varies at least in accordance with a result of voice recognition and varies with the lapse of time, in conformity with a predetermined emotion-parameter generation rule;

response generation means for generating a response to a result of voice recognition in conformity with a predetermined response generation rule based on at least said emotion parameter;

response output means for outputting said response; and communication means for carrying out processing to update said recognition rule, said emotion-parameter generation rule and said response generation rule by connection to a predetermined network; or communication means for carrying out processing to update data necessary for said recognition rule, said emotion-parameter generation rule and said response generation rule by connection to said predetermined network.

2. The electronic pet apparatus according to claim 1, said apparatus characterized in that said communication means periodically connects said electronic pet apparatus to said network in order to carry out said update processing.

3. The electronic pet apparatus according to claim 1, said apparatus characterized in that at least said emotion parameter or data required in generation of said emotion parameter can be updated by using data stored in replaceable recording media.

4. An electronic pet apparatus characterized in that said apparatus comprises:

voice input means for inputting a voice output by the user;

voice recognition means for recognizing a voice received from said voice input means and for outputting a result of voice recognition in conformity with a predetermined recognition rule;

emotion generation means for generating an emotion parameter, which indicates an emotion in a pseudo manner as well as varies at least in accordance with a result of voice recognition and varies with the lapse of time, in conformity with a predetermined emotion-parameter generation rule;

response generation means for generating a response to a result of voice recognition in conformity with a predetermined response generation rule based on at least said emotion parameter;

response output means for outputting said response; and communication means for carrying out processing to acquire at least said emotion parameter or data necessary for generating said emotion parameter by connection to said predetermined network, wherein said response generation means generates a response depending on said emotion parameter acquired by said communication means or a response depending on an emotion parameter generated from said data acquired by said communication means.

5. The electronic pet apparatus according to claim 4, said apparatus characterized in that at least said emotion parameter or data required in generation of said emotion parameter can be updated by using data stored in replaceable recording media.

6. An electronic pet apparatus characterized in that said apparatus comprises:

voice input means for inputting a voice output by the user;

voice recognition means for recognizing a voice received from said voice input means and for outputting a result of voice recognition;

a data base comprising a result of voice recognition of a word included in the voice and the type of said word;

response generation means for searching, in accordance with a result of voice recognition, said data base for the type of a word included in the voice represented by said result of voice recognition and for generating a response to said result of voice recognition in dependence of said type;

response output means for outputting said response; and cataloging means capable of changing said data base in accordance with the voice representing a word in a cataloging operation mode at least by cataloging a result of recognition of said word into said data base.

7. The electronic pet apparatus according to claim 6, said apparatus characterized in that:

said voice recognition means identifies a voice and outputs a result of voice recognition as a series of phonemes; and said cataloging means records a result of voice recognition of a word included in the voice and the type of said word according to a series of phonemes representing a result of voice recognition into said data base.

8. The electronic pet apparatus according to claim 6, said apparatus characterized in that said voice recognition means outputs a result of voice recognition as text data obtained as a result of conversion of the voice.

9. The electronic pet apparatus according to claim 6, said apparatus characterized in that, in a cataloging operation mode, said voice recognition means carries out a voice recognition process by delimiting the voice by using predetermined delimiters.

10. The electronic pet apparatus according to claim 6, said apparatus characterized by further having an emotion generation means for generating a pseudo emotion parameter, which indicates an emotion in a pseudo manner as well as varies at least in accordance with a result of voice recognition and varies with the lapse of time, in conformity with a predetermined pseudo-emotion-parameter generation rule, wherein said response generation means generates a response to a result of voice recognition in conformity with a predetermined response generation rule taking at least said pseudo emotion parameter as a reference.

11. The electronic pet apparatus according to claim 6, said apparatus characterized by being capable of exchanging at least said pseudo emotion parameter or data necessary for generation of said pseudo emotion parameter through replaceable recording media.

12. An electronic pet apparatus characterized in that said apparatus comprises:

voice input means for inputting a voice output by the user;

voice recognition means for recognizing a voice received from said voice input means and for outputting a result of voice recognition;

response generation means for generating a response to a result of voice recognition in conformity with a predetermined response generation rule;

response output means for outputting said response; and user authentication means for authenticating the user on the basis of the voice output by said user, wherein said response generation means generates a response to a person entering a voice with said response varied in dependence on a result of authentication produced by said user authentication means.

13. The electronic pet apparatus according to claim 12, said apparatus characterized in that said user authentication means forms a judgment on a result of voice recognition with a past result of voice recognition used as a reference and authenticates the user on the basis of a result of said judgment.

14. The electronic pet apparatus according to claim 13, said apparatus characterized in that:

said response generation means raises a query about a past result of voice recognition as a response; and said user authentication means forms a judgment on a result of voice recognition of a response to said query in order to authenticate the user.

15. The electronic pet apparatus according to claim 13, said apparatus characterized in that said past result of voice recognition is a predetermined word.

16. The electronic pet apparatus according to claim 12, said apparatus characterized in that said user authentication means detects a characteristic quantity representing a characteristic of the voice output by the user from a result of voice recognition and authenticates said user on the basis of said characteristic quantity.

17. The electronic pet apparatus according to claim 12, said apparatus characterized by further having an emotion generation means for generating a pseudo emotion parameter, which indicates an emotion in a pseudo manner as well as varies at least in accordance with a result of voice recognition and varies with the lapse of time, in conformity with a predetermined pseudo-emotion-parameter generation rule, wherein said response generation means generates a response to a result of voice recognition in conformity with a predetermined response generation rule taking at least said pseudo emotion parameter as a reference.

18. An electronic pet apparatus characterized in that said apparatus comprises:

voice input means for inputting a voice output by the user;

voice recognition means for recognizing a voice received from said voice input means and for outputting a result of voice recognition;

response generation means for generating a response to a result of voice recognition in conformity with a predetermined response generation rule;

response output means for outputting said response; and word/phrase classification means for identifying the type of an input represented by the voice based on said voice, wherein said response generation rule is a rule of generating responses excluding a response of a predetermined type in accordance with the type of an input and a category of a response to said input.

19. The electronic pet apparatus according to claim 18, said apparatus characterized by further having a history recording means used for storing a history of at least types of inputs each entered as a voice and categories of responses to said inputs generated by said response generation means, wherein said response generation means generates a response by referring to said history stored in said history recording means.

20. The electronic pet apparatus according to claim 18, said apparatus characterized by further having an emotion generation means for generating a pseudo emotion parameter, which indicates an emotion in a pseudo manner as well as varies at least in accordance with a result of voice recognition and varies with the lapse of time, in conformity with a predetermined pseudo-emotion-parameter generation rule, wherein said response generation means generates a response to a result of voice recognition in conformity with a predetermined response generation rule taking at least said pseudo emotion parameter as a reference.

21. An electronic pet apparatus characterized in that said apparatus comprises:

voice input means for inputting a voice output by the user;

voice recognition means for recognizing a voice received from said voice input means in conformity with a predetermined recognition rule and for outputting a result of voice recognition;

emotion generation means for generating an emotion parameter, which indicates an emotion in a pseudo manner as well as varies at least in accordance with a result of voice recognition and varies with the lapse of time, in conformity with a predetermined emotion-parameter generation rule;

response generation means for generating a response to a result of voice recognition in conformity with a predetermined response generation rule taking at least said emotion parameter as a reference; and response output means for outputting said response, wherein said emotion generation means has a history recording means used for recording a history of at least a result of voice recognition and said emotion parameter corresponding to said result of voice recognition, and a variation in said emotion parameter according to said result of voice recognition is changed in accordance with said history.

22. The electronic pet apparatus according to claim 21, said apparatus characterized in that:

said emotion generation means changes said emotion parameter in accordance with a word which is included in an input voice and excites an emotion; and when a specific word other than said word exciting an emotion is used at the same time as said word exciting an emotion and as many times as said word exciting an emotion is, said specific word used at the same time as said word exciting an emotion and as many times as said word exciting an emotion also causes said emotion parameter to be changed as said word exciting an emotion does.

23. The electronic pet apparatus according to claim 21, said apparatus characterized in that:

said emotion generation means changes said emotion parameter in accordance with a word which is included in an input voice and excites an emotion; and when a particular word exciting an emotion is used frequently, a variation in said emotion parameter caused by said particular word exciting an emotion is reduced.

* * * * *